(12) United States Patent
Foreman

(10) Patent No.: US 12,320,923 B2
(45) Date of Patent: Jun. 3, 2025

(54) RADAR DETECTION OF MIGRATING TARGETS USING SIGNAL CONVOLUTION AND INTERFERENCE CORRELATION MATRICES

(71) Applicant: Terry Lee Foreman, Colonial Beach, VA (US)

(72) Inventor: Terry Lee Foreman, Colonial Beach, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 309 days.

(21) Appl. No.: 18/071,774

(22) Filed: Nov. 30, 2022

(65) Prior Publication Data

US 2024/0168129 A1 May 23, 2024

Related U.S. Application Data

(63) Continuation-in-part of application No. 16/916,525, filed on Jun. 30, 2020, now Pat. No. 11,733,351.

(51) Int. Cl.
| | |
|---|---|
| *G01S 7/41* | (2006.01) |
| *G01S 7/02* | (2006.01) |
| *G01S 7/35* | (2006.01) |

(52) U.S. Cl.
CPC .............. *G01S 7/414* (2013.01); *G01S 7/023* (2013.01); *G01S 7/354* (2013.01); *G01S 7/415* (2013.01)

(58) Field of Classification Search
CPC .......... G01S 7/414; G01S 7/023; G01S 7/354; G01S 7/415; G01S 13/42; G01S 7/2923
See application file for complete search history.

(56) References Cited

U.S. PATENT DOCUMENTS

| | | | |
|---|---|---|---|
| 6,252,540 B1 | 6/2001 | Hale et al. | 342/159 |
| 9,857,455 B2 | 1/2018 | Foreman | G01S 7/4008 |
| 2006/0273951 A1 | 12/2006 | Adams et al. | G01S 13/273 |
| 2012/0320363 A1 | 12/2012 | Goodman | G01C 3/08 |

(Continued)

OTHER PUBLICATIONS

L. Maślikowski "Calibration of MIMO Radar Transmitting and Receiving Array Using Sene Object Measurement" Remote Sens. 14m 3573 (2022).

*Primary Examiner* — Donald H B Braswell
(74) *Attorney, Agent, or Firm* — Gerhard W. Thielman

(57) ABSTRACT

A computer-implemented method for detecting a target amidst clutter by a radar system able to transmit individual electromagnetic signals, wherein a sequence of the transmit signals are sent from first to last on separate transmit antennae, receive the signals reflected off the target and the clutter, and process the received signals. The method includes determining a baseband signal for each of the transmit signals; calculating a signal convolution matrix for each of the transmit signals; estimating a clutter amplitude for each range cell; calculating a clutter correlation matrix for the clutter; determining a noise variance for the transmitted signals; calculating an interference correlation matrix for the transmit signals; and forming a target detector for the radar system. The target detector for the radar system further includes sequentially processing the reflection signals, rejecting cross talk from the clutter correlation matrix, and increasing a signal-to-interference ratio, thereby optimizing the detectability of the target.

5 Claims, 14 Drawing Sheets

(56) References Cited

U.S. PATENT DOCUMENTS

| | | | |
|---|---|---|---|
| 2021/0223385 A1 | 7/2021 | Breton et al. | G01S 7/414 |
| 2022/0091232 A1 | 3/2022 | Foreman | G01S 7/414 |
| 2023/0394691 A1* | 12/2023 | Guizilini | G01S 13/867 |

* cited by examiner

*Table I. Waveform Parameters*

| | Samples | Pulse Width | Bandwidth | Modulation | $f_0$ Frequency Offset |
|---|---|---|---|---|---|
| Long Pulse | N1 = 1600 | 16 μsec | 2.5 MHz | Linear Chirp | -2.5 MHz |
| Short Pulse | N2 = 16 | 0.4 μsec | 2.5 MHz | Unmodulated | 2.5 MHz |

← 1610

*Table II Overlapping Spectrum Waveform Parameters*

| Signal | Modulation | Pulse Width | Time Bandwidth Product | Center Frequency |
|---|---|---|---|---|
| $s^1$ | Down/Up Chirp | 11.25 μsec | 28.125 | 0 MHz |
| $s^2$ | Up/Down Chirp | 11.25 μsec | 28.125 | 0 MHz |
| $s^3$ | Up Chirp | 11.25 μsec | 28.125 | 0 MHz |
| $s^4$ | Down Chirp | 11.25 μsec | 28.125 | 0 MHz |

← 1620

*Table III Overlapping Spectrum Signal Correlation*

| Signals | Correlation Coefficient |
|---|---|
| $s^1\ s^2$ | 0.1463 |
| $s^1\ s^3$ | 0.0452 |
| $s^1\ s^4$ | 0.0452 |
| $s^2\ s^3$ | 0.0452 |
| $s^2\ s^4$ | 0.0452 |
| $s^3\ s^4$ | 0.1274 |

1630 →

*Table IV Non-overlapping Spectrum Waveform Parameters*

| Signal | Modulation | Pulse Width | Time Bandwidth Product | Center Frequency |
|---|---|---|---|---|
| $s^1$ | Down/Up Chirp | 15 μsec | 37.5 | 15.0 MHz |
| $s^2$ | Up/Down Chirp | 15 μsec | 37.5 | 7.5 MHz |
| $s^3$ | Up Chirp | 15 μsec | 37.5 | 0 MHz |
| $s^4$ | Down Chirp | 15 μsec | 37.5 | -7.5 MHz |

← 1640

*Table V Signal Correlation*

| Signals | Correlation Coefficient |
|---|---|
| $s^1\ s^2$ | 0.0029 |
| $s^1\ s^3$ | 0.0015 |
| $s^1\ s^4$ | 0.00068 |
| $s^2\ s^3$ | 0.0047 |
| $s^2\ s^4$ | 0.0020 |
| $s^3\ s^4$ | 0.0038 |

RADAR DETECTION OF MIGRATING TARGETS USING SIGNAL CONVOLUTION AND INTERFERENCE CORRELATION MATRICES

CROSS REFERENCE TO RELATED APPLICATION

The invention is a Continuation-in-Part, claims priority to and incorporates by reference in its entirety U.S. patent application Ser. No. 16/916,525 filed Jun. 30, 2020 and assigned Navy Case 113045.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to multiple input multiple output (MIMO) radar detection of targets. In particular, the invention relates to improving the detection of multiple input multiple output radar signal processing of targets in clutter.

SUMMARY

Conventional multiple input multiple output radar detection techniques yield disadvantages addressed by various exemplary embodiments of the present invention. In particular, various exemplary embodiments provide a computer-implemented method for detecting a target amidst clutter by a radar system able to transmit individual electromagnetic signals, wherein a sequence of the transmitted signals are sent from first to last on separate transmit antennae, receive the signals reflected off the target and the clutter, and process the received signals.

The method includes determining a baseband signal for each of the transmitted signals; calculating a convolution matrix for each of the transmitted signals; estimating a clutter amplitude for each range cell using modeling estimations; calculating a clutter covariance matrix for the clutter; determining a noise variance for the transmitted signals; calculating an interference correlation matrix for the transmitted signals; and forming a target detector for the radar system. The target detector for the radar system further includes simultaneously processing all the received signals, rejecting received clutter cross talk between the transmitted signals, and maximizing the signal-to-interference ratio, thereby optimizing the detectability of the target.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 16 is a tabular view of waveform parameters;

DETAILED DESCRIPTION

Figure 1:
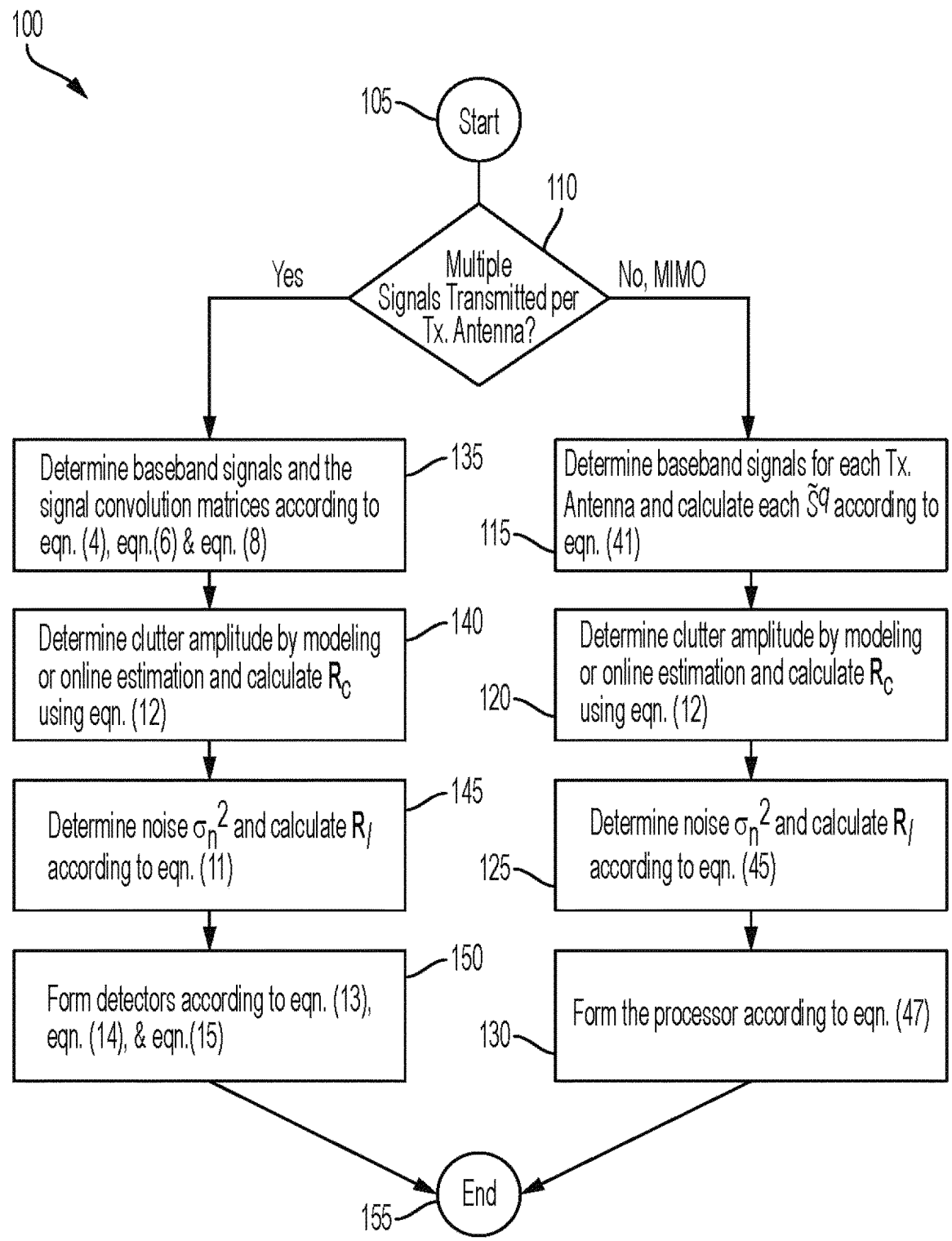
FIG. 1 is a flowchart view of Multiple Input Multiple Output (MIMO) radar signal processing in clutter.

In the following exemplary embodiments of the invention, reference is made to the accompanying drawings that form a part hereof, and in which is shown by way of illustration specific exemplary embodiments in which the inventions may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance of a presently preferred embodiment of the present invention, the components, process steps, and/or data structures may be implemented using various types of operating systems, computing platforms, computer programs, and/or general purpose machines. In addition, artisans of ordinary skill will readily recognize that devices of less ordinary purpose nature, such as hardwired devices, may also be used without departing from the scope and spirit of the inventive concepts disclosed herewith. General purpose machines include devices that execute instruction code. A hardwired device may constitute an application specific integrated circuit (ASIC), a field programmable gate array (FPGA), digital signal processor (DSP) or other related component. The disclosure generally employs quantity units with the following abbreviations: signal strength in decibels (dB) and frequencies in hertz (Hz).

Conventional methods for MIMO signal processing implement the use of a matched filter to separate the transmitted signal. The matched filter, however, is not the optimum detector for targets that are competing with noise and clutter. Due to the improbability of perfectly orthogonal MIMO signals, there is the possibility of clutter cross talk between channels, thus increasing clutter in the received signal. The optimum detector offers an improvement on MIMO radar signal processing in clutter as visualized in the following illustrations.

Section I—MIMO Radar Signal Processing and Improvements: Multiple Input Multiple Output (MIMO) radar detection is accomplished by dividing the transmit antenna into multiple antennas enabling additional degrees of freedom to achieve a number of design goals. Each of these antennas transmits a distinct orthogonal signal. Additionally, there are multiple receive antennas each receiving the orthogonally transmitted signals. Conventional practice requires the transmitted signals are received and separated by matched filtering for each transmitted signal.

The conventional matched filtering approach, however, is not the optimum detector for MIMO radar signal processing when clutter is involved. The reason for this is that matched filters are optimal when the interference process is only additive white Gaussian noise (AWGN). Once targets are competing with noise and clutter, the matched filter has a notable drop in accuracy. Further, it is virtually impossible to generate signals that are perfectly orthogonal, thus providing the opportunity of clutter cross talk between channels of matched filters. One should note that the optimum detector and matched filter perform similarly in the presence of AWGN only. Therefore, the optimum detector seeks to improve target detectability in clutter for MIMO radar signal processing. This process can be visualized with some illustrations:

FIG. 1 shows a flowchart view 100 of MIMO radar signal processing in clutter. The process begins with start 105 and determines if there are multiple signals transmitted per antenna 110. If there are not multiple transmissions per antenna (MIMO), then the baseband signal for each transmit antenna is determined, and each convolution matrix is calculated 115. The process continues 120 to determine clutter amplitude, by modeling or online estimation. Proceeding to 125, noise variance is determined, and interference correlation matrix is calculated. Afterwards 130, the processor is formed, and the process terminates 155. If there are multiple transmissions during 110 (not MIMO), then the baseband signals are determined and the three convolution matrices are calculated 135. The process continues 140 to determine clutter amplitude, by modeling or online estimation, and calculate the clutter covariance matrix. Proceeding to 145, noise variance is determined and interference correlation matrix is calculated. Afterwards 150, the three detectors are formed and the process terminates 155.

Figure 2:
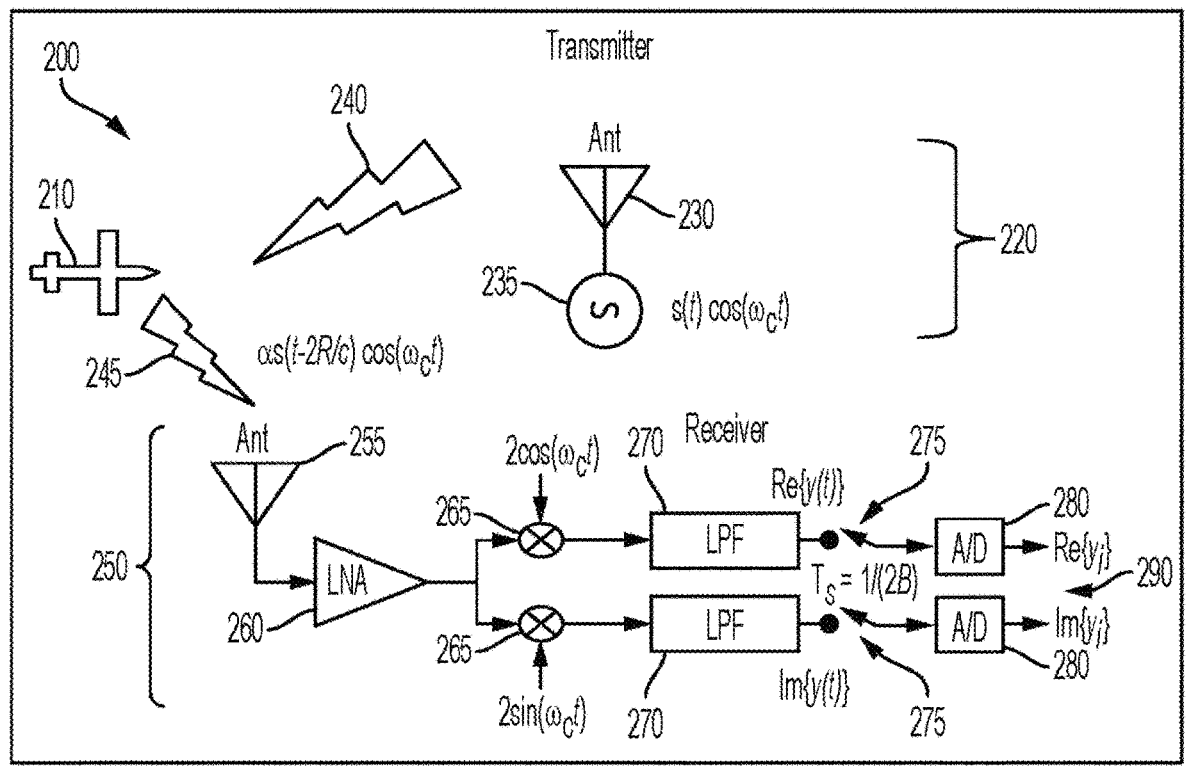
FIG. 2 is a schematic diagram view of radar hardware.

FIG. 2 shows a schematic diagram view 200 of hardware for the radar to detect a generic target 210. A transmitter 220 includes a signal generator 235 and transmit antenna 230. The transmitter 220 emits a transmit pulse signal 240 that the target 210 reflects as a reflection signal 245. The pulse signal 240 can be repeated at intervals corresponding to a pulse repetition frequency (PRF). A receiver 250 receives the reflection signal 245 by a receive antenna 255. A low noise amplifier (LNA) 260 amplifies the received signal into pairs of mixers 265, low-pass filters (LPF) 270 detect the baseband signal and separates the signal into real and imaginary components, switches 275 convert the analog signal into discrete time signals, and analog to digital (A/D) converters 280 convert the signal into digital numbers to form the complex baseband of digital data 290 used to operate the detector.

Section II—Long Pulse/Short Pulse Problem: Before addressing the full MIMO problem, a related problem of clutter cross talk in long pulse/short pulse radar processing must be considered. In this problem, crosstalk is shown to be present even though the transmit signals are thought to be orthogonal. This is a practical problem for existing radars and should be viewed as a simplified version of MIMO radar signal processing.

Figure 3:
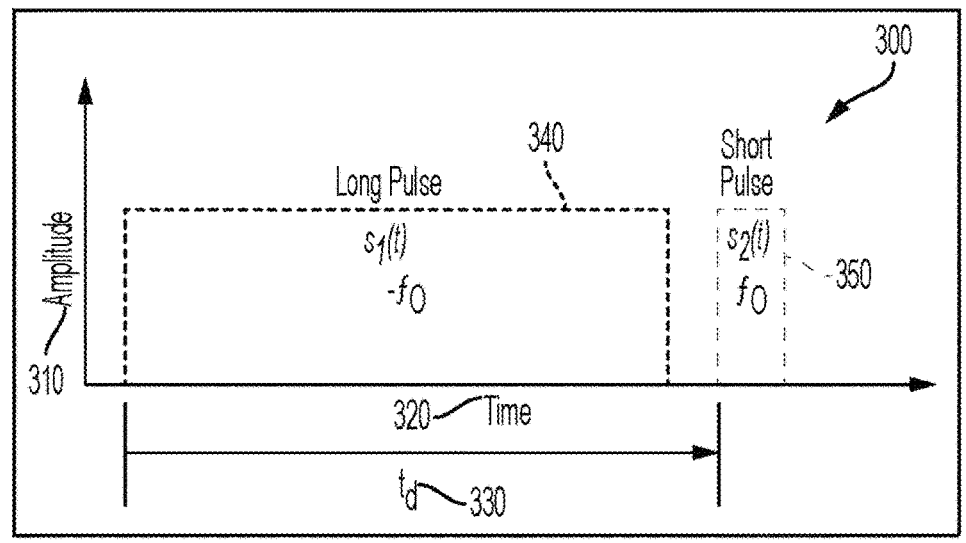
FIG. 3 is a graphical view of long and short pulse signals.

FIG. 3 shows a graphical view 300 of long and short pulse signals. Radars that use long pulses 340 in order to achieve sensitivity to detect long range targets will often transmit a short pulse 350 to detect short range targets that would otherwise be eclipsed by the long pulse. The second short pulse is transmitted immediately after the long pulse with the same amplitude 310 at a different time 320. Once the radar transmits 220 both pulses, the receiver 250 turns on to process target returns 245 from both pulses. The radar differentiates returns based on frequency and both pulses are processed by matched filters to form detection statistics. The separation of pulses 330 is assumed to ensure that the signals are orthogonal. The transmitted pulse baseband representation is:

$$s(t)=s_1(t)\exp(-j2\pi f_0 t)+s_2(t-t_d)\exp(-j2\pi f_0 t), \quad (1)$$

where $s_1(t)$ and $s_2(t)$ are the two baseband signals, $f_0$ is the frequency offset that gives orthogonality to $s_1(t)$ and $s_2(t)$, and $t_d$ is the time delay 330 between the pulses. The received data due to a point target 210 are:

$$y_t(t)=\alpha(s_1(t-t_r)\exp(-j2\pi f_0 t)+s_2(t-t_d-t_r)\exp(-j2\pi f_0 t), \quad (2)$$

where $\alpha$ is the complex amplitude of the target 210 and $t_r$ is time delay of the target 210 based on range.

The output of the A/D converter 280 is represented as:

$$y_t=\alpha \tilde{S}\delta_k, \quad (3)$$

where $$\tilde{S} = \begin{bmatrix} 0 & \cdots & s_1^1 & \cdots & s_{N_1}^1 & 0 & s_1^2 & \cdots & s_{N_2}^2 \\ & & & & \ddots & & & & \\ s_1^1 & \cdots & s_{N_1}^1 & 0 & s_1^2 & \cdots & s_{N_2}^2 & \cdots & 0 \end{bmatrix}, \quad (4)$$

such that $s_i^1=s_1[(i-1)T_s]\exp(-j2\pi f_0(i-1)T_s)$, and $s_i^2=s_2[(i-1)T_s]\exp(+j2\pi f_0(i-1)T_s)$, while i is the time index, $T_s$ is the sample time, and $\delta_k$ is a vector of all zeros except the $k^{th}$ element which is one indicating the location of the target 210. The matrix $\tilde{S}$ has the size (P+N−1)×(P+2(N−1)), where $$N = \frac{t_d}{T_s} + N_2.$$

Note eqn. (3) indicates that the target response is the convolution of the target 210 and incident signal that produces $\tilde{S}$ as the convolution matrix.

The signal model for the long pulse 340 channel is represented as:

$$y_{t1} = \alpha \tilde{S}^1 \delta_k, \quad (5)$$

where $\tilde{S}^1$ is the signal convolution matrix for the long pulse 340 calculated as:

$$\tilde{S}^1 = \begin{bmatrix} 0 & \cdots & s_1^1 & \cdots & s_{N_1}^1 & 0 & \cdots & 0 \\ & & & \ddots & & & & \\ s_1^1 & \cdots & s_{N_1}^1 & 0 & & \cdots & & 0 \end{bmatrix}. \quad (6)$$

The signal model for the short pulse 350 channel is represented as:

$$y_{t2} = \alpha \tilde{S}^1 \delta_k, \quad (7)$$

where $\tilde{S}^2$ is the signal convolution matrix for the short pulse 350 calculated as:

$$\tilde{S}^2 = \begin{bmatrix} 0 & \cdots & s_1^2 & \cdots & s_{N_2}^2 \\ & & & \ddots & \\ s_1^2 & \cdots & s_{N_2}^2 & \cdots & 0 \end{bmatrix}. \quad (8)$$

The received data due to interference is represented as:

$$y_I = \tilde{S}c + n, \quad (9)$$

where c is a vector of length P+2(N−1) reverse range ordered complex clutter voltage and n is a vector of length P+N−1 of AWGN.

The interference correlation matrix is determined by:

$$R_I = E\{y_I y_I^H\} = E\{\tilde{S}cc^H \tilde{S}^H\} + E\{nn^H\}, \quad (10)$$

where E{ } denotes and expectancy function and superscript H indicates conjugate transpose. This matrix $R_I$ assumes that the noise and clutter are zero mean and uncorrelated. Factoring in the assumption that the clutter is spatially white produces:

$$R_I = \tilde{S}\tilde{R}_C \tilde{S} + \sigma^2 I \quad (11)$$

where I represents the identity matrix and $\sigma_n^2$ is the noise variance, $$R_C = \begin{bmatrix} \sigma_1^2 & & 0 \\ & \ddots & \\ 0 & & \sigma_{P+2(N-1)}^2 \end{bmatrix}, \quad (12)$$

and $\sigma_i^2$ is the variance of the clutter at the $i^{th}$ cell.

Subsection (a)—Optimum Detector and Matched Filter for Long Pulse/Short Pulse: Under the assumption that clutter is a compound Gaussian process whitening matched filters operate as an optimum detector as described herein. Detectors are formed operating on data 290 using estimates of the clutter parameters to produces near optimum performance. Referencing the signal and interference models developed above, the detector processing short and long pulse data is formed as:

$$\left| \delta_k^H \tilde{S}^H R_I^{-1} y \right| \begin{array}{c} H_1 \\ > \\ < \\ H_0 \end{array} \eta, \quad (13)$$

where η is the detection threshold selected to achieve the desired probability of false alarm. This method utilizes all of the data to make a detection decision. The optimum detector for the long pulse 340 channel is:

$$\left| \delta_k^H (\tilde{S}^1)^H R_I^{-1} y \right| \begin{array}{c} H_1 \\ > \\ < \\ H_0 \end{array} \eta. \quad (14)$$

Note that the long pulse 340 optimum detector can detect partially eclipsed targets, but not fully eclipsed targets. The optimum detector for the short pulse 350 channel is:

$$\left| \delta_k^H (\tilde{S}^2)^H R_I^{-1} y \right| \begin{array}{c} H_1 \\ > \\ < \\ H_0 \end{array} \eta. \quad (15)$$

Note that the short pulse 350 optimum detector can detect fully eclipsed targets missed by the long pulse 340 detector.

Use of matched filters is the current state of the art for radar processing detection statistics. When only AWGN is involved the matched filter operates similarly to an optimum detector. A combined short pulse 350 and long pulse 340 matched filter is formed as:

$$\left| \delta_k^H \tilde{S}^H y \right| \begin{array}{c} H_1 \\ > \\ < \\ H_0 \end{array} \eta. \quad (16)$$

Standard operation utilizes separate channels for each pulse. The long pulse 340 matched filter is formed as:

$$\left| \delta_k^H (\tilde{S}^1)^H y \right| \begin{array}{c} H_1 \\ > \\ < \\ H_0 \end{array} \eta. \quad (17)$$

The short pulse 350 matched filter is formed as:

$$\left| \delta_k^H (\tilde{S}^2)^H y \right| \begin{array}{c} H_1 \\ > \\ < \\ H_0 \end{array} \eta. \quad (18)$$

The matched filter is designed to maximize signal power in the presence of white noise power when making a detection decision. The matched filter will also attenuate the other interfering signal (long pulse signal in the short pulse channel or the short pulse signal in the long pulse channel). However, this attenuation is incidental to the filter's function, thereby making the optimum detector an improvement on the current state of the art for radar signal processing in clutter, due to the detectors ability to reject clutter cross talk.

Subsection (b)—Determining Output Signal-to-Interference Ratio (SIR) for Detectors: Using the previously outlined equations SIR for these detectors is determined. SIR information enables further proof of the optimum detector's exemplary relative performance over the matched filter. The output SIR for the combined short/long pulse optimum detector is determined by substituting the signal model for y in eqn. (13) giving:

$$z_t = \delta_k^H \tilde{S}^H R_I^{-1} \tilde{S} \alpha \delta_k. \quad (19)$$

The power output of the combined detector due to the target 210 is:

$$|z_t|^2 = |\alpha|^2 (\delta_k^H \tilde{S}^H R_I^{-1} \tilde{S} \alpha \delta_k)^2. \quad (20)$$

The output of the combined detector due to the interference is:

$$z_i = \delta_k^H \tilde{S}^H R_I^{-1} y_I. \quad (21)$$

The power output of the detector due to the interference applying eqns. (9) and (10) is determined as:

$$E\{z_i z_i^*\} = E\{\delta_k^H \tilde{S}^H y_I y_I^H \tilde{S} \delta_k\} = \delta_k^H \tilde{S}^H R_I \tilde{S} \delta_k. \quad (22)$$

Taking the ratio of the output signal and interference powers gives the output SIR as:

$$SIR_{comb} = |\alpha|^2 \delta_k^H \tilde{S}^H R_I^{-1} y_I y_I^H R_I^{-1} \tilde{S} \delta_k. \quad (23)$$

Taking a similar approach on developing eqn. (23), the SIR for the long pulse 340 is found as:

$$SIR_{LP} = \frac{|\alpha|^2 \left(\delta_k^H (\tilde{S}^1)^H R_{ID}^{-1} y_I y_I^H R_{ID}^{-1} \tilde{S}^1 \delta_k\right)^2}{\delta_k^H (\tilde{S}^1)^H R_{ID}^{-1} y_I y_I^H R_{ID}^{-1} \tilde{S}^1 \delta_k}. \quad (24)$$

Taking a similar approach on developing eqn. (23), the SIR for the short pulse 350 is found as:

$$SIR_{SP} = \frac{|\alpha|^2 \left(\delta_k^H (\tilde{S}^2)^H R_{ID}^{-1} y_I y_I^H R_{ID}^{-1} \tilde{S}^2 \delta_k\right)^2}{\delta_k^H (\tilde{S}^2)^H R_{ID}^{-1} y_I y_I^H R_{ID}^{-1} \tilde{S}^2 \delta_k}. \quad (25)$$

Using matched filter processing the signal amplitude for the detector is found using output due to the target 210 as:

$$z_t = \delta_k^H \tilde{S}^H \tilde{S} \alpha \delta_k \quad (26)$$

This gives the power output from the detector due to the target 210 as:

$$|z_t|^2 = |\alpha|^2 (\delta_k^H \tilde{S}^H \tilde{S} \alpha \delta_k)^2. \quad (27)$$

The output of the matched filter with interference is:

$$z_i = \delta_k^H \tilde{S}^H \tilde{S} y_I. \quad (28)$$

The interference power output of the matched filter that processes both pulses is:

$$E\{z_i z_i^*\} = E\{\delta_k^H \tilde{S}^H y_I y_I^H \tilde{S} \delta_k\} = \delta_k^H \tilde{S}^H R_I \tilde{S} \delta_k. \quad (29)$$

Utilizing eqns. (26) and (27), the SIR for the matched filter is found as:

$$SIR_{LP} = \frac{|\alpha|^2 \left(\delta_k^H (\tilde{S}^1)^H R_I^{-1} y_I y_I^H R_I^{-1} \tilde{S}^1 \delta_k\right)}{\delta_k^H (\tilde{S}^1)^H R_I^{-1} y_I y_I^H R_I^{-1} \tilde{S}^1 \delta_k}. \quad (30)$$

Using eqn. (30) as a reference the SIR for the long pulse 340 matched filter is found as:

$$SIR_{MF\_LP} = \frac{|\alpha|^2 \left(\delta_k^H (\tilde{S}^1)^H \tilde{S}^1 \delta_k\right)}{\delta_k^H (\tilde{S}^1)^H R_I \tilde{S}^1 \delta_k}. \quad (31)$$

Using eqn. (30) as a reference the SIR for the short pulse 350 matched filter is found as:

$$SIR_{MF\_SP} = \frac{|\alpha|^2 \left(\delta_k^H (\tilde{S}^2)^H \tilde{S}^2 \delta_k\right)}{\delta_k^H (\tilde{S}^2)^H R_I \tilde{S}^2 \delta_k}. \quad (32)$$

A situation may occur in which the optimum detector is mismatched to the clutter scene and receives errors in the clutter parameters. For the mismatched optimum detector, the SIR for the detector is found using power output due to the target 210 as:

$$|z_t|^2 = |\alpha|^2 (\delta_k^H \tilde{S}^H R_{ID}^{-1} \tilde{S} \alpha \delta_k)^2, \quad (33)$$

where $R_{ID}$ is the design interference correlation matrix or misestimated matrix.

The output of the combined detector due to interference is:

$$z_i = \delta_k^H \tilde{S}^H R_{ID}^{-1} y_I. \quad (34)$$

from eqn. (34), the power output due to interference for the combined detector is:

$$E\{z_i z_i^*\} = E\{\delta_k^H \tilde{S}^H y_I y_I^H \tilde{S} \delta_k\} = \delta_k^H \tilde{S}^H R_I \tilde{S} \delta_k. \quad (35)$$

where $R_{IA}$ is the actual interference correlation matrix. Taking the ratio of eqns. (33) and (35), the SIR for the mismatched optimum detector is:

$$SIR_{comb} = \frac{|\alpha|^2 \delta_k^H \tilde{S}^H R_{ID}^{-1} \tilde{S} \delta_k}{\delta_k^H \tilde{S}^H R_{ID}^{-1} R_{IA} R_{ID}^{-1} \tilde{S} \delta_k}. \quad (36)$$

Using the approach in deriving eqn. (36), the SIR for the long pulse 340 mismatched optimum detector is found as:

$$SIR_{LP} = \frac{|\alpha|^2 \left(\delta_k^H (\tilde{S}^1)^H R_{ID}^{-1} y_I y_I^H R_{ID}^{-1} \tilde{S}^1 \delta_k\right)}{\delta_k^H (\tilde{S}^1)^H R_{ID}^{-1} y_I y_I^H R_{ID}^{-1} \tilde{S}^1 \delta_k} \quad (37)$$

Using the approach in deriving eqn. (36), the SIR for the short pulse 350 mismatched optimum detector is found as:

$$SIR_{SP} = \frac{|\alpha|^2 \left(\delta_k^H (\tilde{S}^2)^H R_{ID}^{-1} y_I y_I^H R_{ID}^{-1} \tilde{S}^2 \delta_k\right)}{\delta_k^H (\tilde{S}^2)^H R_{ID}^{-1} y_I y_I^H R_{ID}^{-1} \tilde{S}^2 \delta_k}. \quad (38)$$

Section III—Performance Examples for Comparing Short/Long Pulse Radar Detectors: To illustrate the improvements in long/short pulse radar signal processing in clutter, made possible by the optimum detector, the following example is provided.

Skipping ahead, FIG. 16 is a tabular view 1600 showing waveform properties. The properties for the short and long pulse signals are displayed in view 1610 with the pulses illustrated in FIG. 3. A radar transmits a linear chirp waveform 340 followed by an uncoded short pulse 350. The combined return is down converted to baseband and sampled at forty megahertz as shown in FIG. 2.

Figure 4:
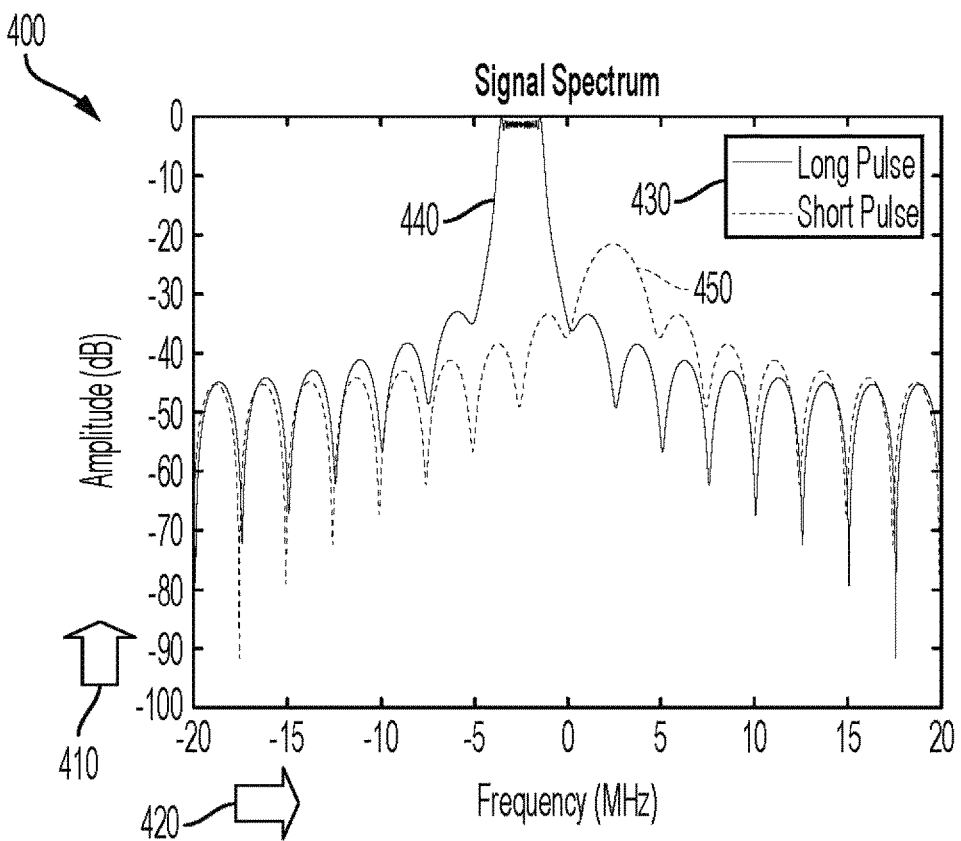
FIG. 4 is a graphical view of long and short pulse signal spectrum.

FIG. 4 shows a graphical view 400 of the signal spectrum produced by transmitting a signal using eqn. (2). Frequency 420 (MHz) denotes the abscissa, while amplitude 410 (dB) denotes the ordinate. A legend 430 identifies lines for the long pulse 440 and short pulse 450 on the produced spectrum. The relative amplitudes 410 of the spectrums is due to the energy difference between the long pulse 440 and the short pulse 450. The value of P, the number of uneclipsed samples in the received data vector, is set at one hundred.

Figure 5:
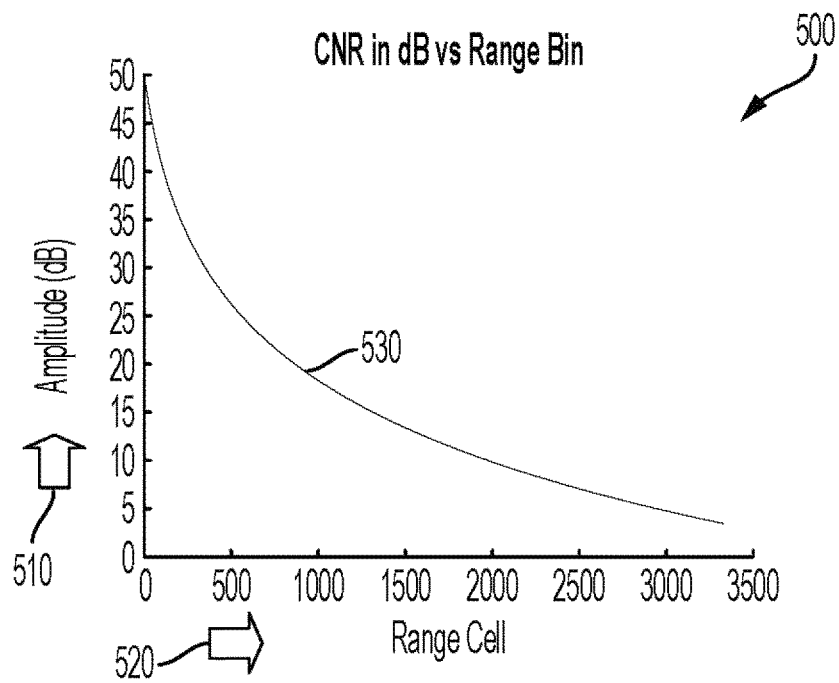
FIG. 5 is a graphical view of the clutter to noise ratio (CNR) as a function of range.

FIG. 5 illustrates a graphical view 500 of the minimum range clutter to noise ratio (CNR) set to fifty decibels. Range cell 520 denotes the abscissa, while amplitude 510 denotes the ordinate. CNR 530 falls off to the minus third power as range increases consistent with surface clutter.

Figure 6:
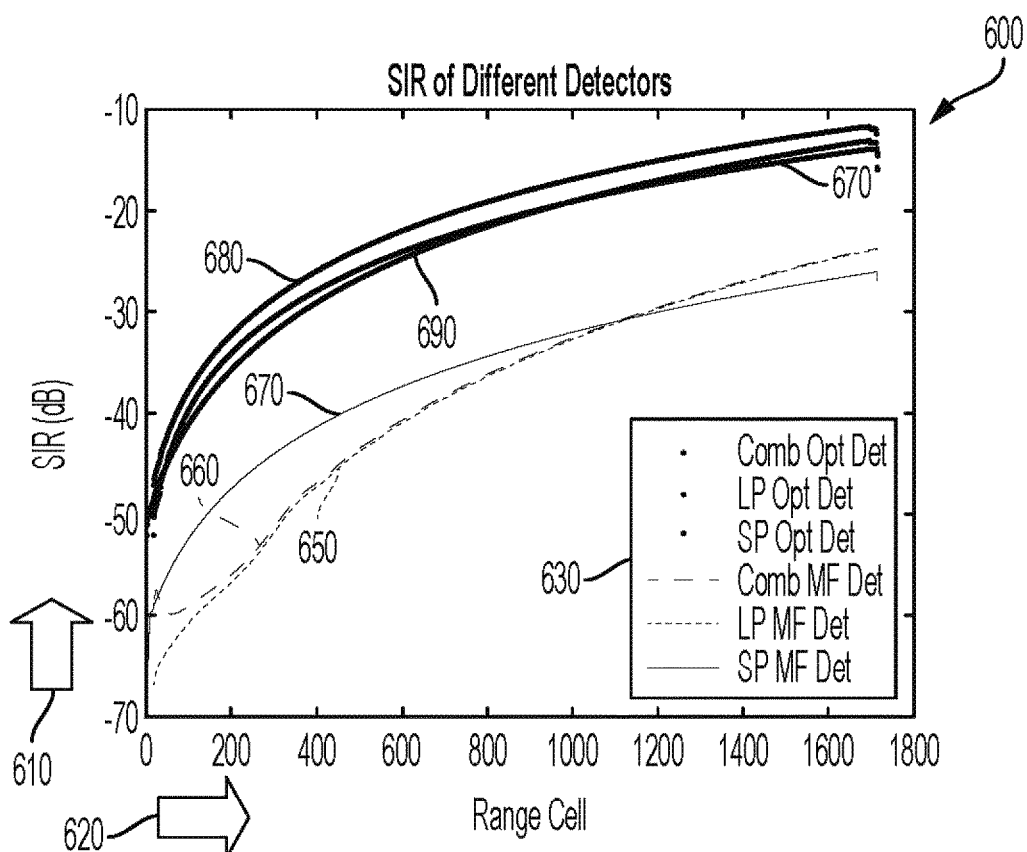
FIG. 6 is a graphical view of signal to interference ratio (SIR) for optimum detector and matched filter of the short pulse, long pulse, and combined pulse signals with ideal clutter.

FIG. 6 shows a graphical view 600 of the plotted SIR for each detector, utilizing the previously determined equations and given conditions. Range cell 620 denotes the abscissa, while SIR 610 (dB) denotes the ordinate. CNR falls off as range 620 increases, resulting in SIR 610 increasing with range increase. The legend 630 identifies symbols for matched filter short pulse 640, long pulse 650, and combined 660. Matched filter SIR increase is less than that of the optimum detector. For the optimum detector, the long pulse 670 and combined 690 SIR are seen above that of the matched filter. The short pulse 680 optimum detector demonstrates the highest overall SIR. This high SIR results from the optimum detector's ability to process receiver noise, clutter from the short pulse 350 channel, and clutter cross talk from the long pulse 340 channel.

Figure 7:
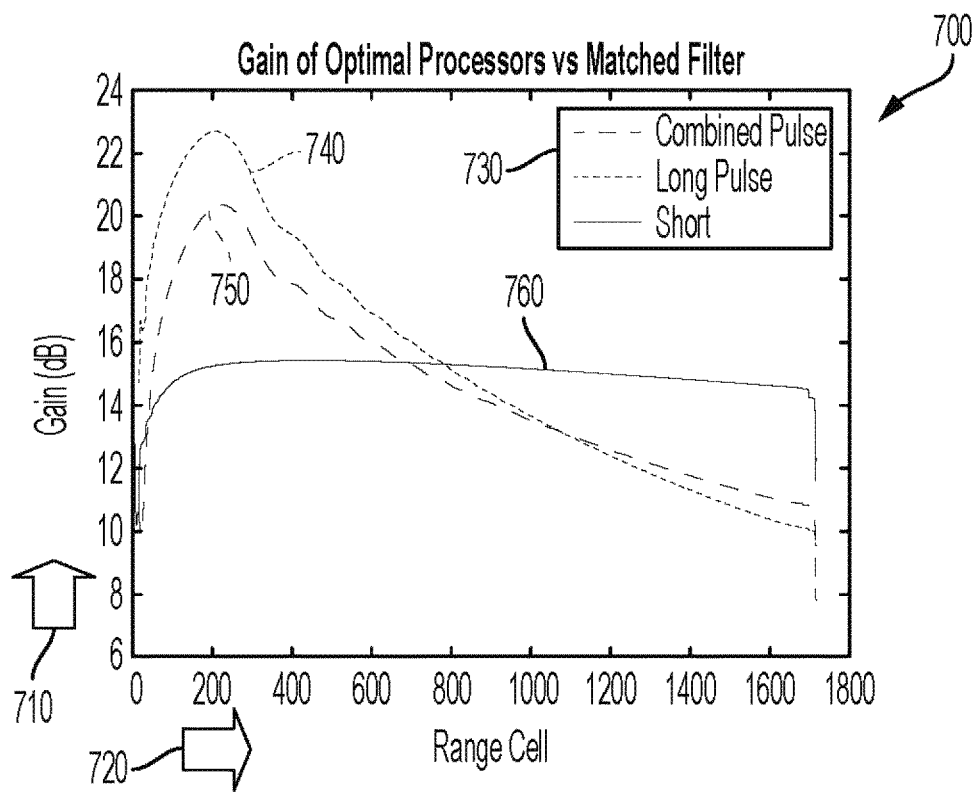
FIG. 7 is a graphical view of SIR gain for the optimum detector over matched filter with ideal clutter.

FIG. 7 displays a graphical view 700 of SIR gain for the optimum detector over the matched filter. Range cell 720 denotes the abscissa, while gain 710 (dB) denotes the ordinate. A legend 730 indicates symbols to track SIR gain 710 for the long pulse 740, combined 750, and short pulse 760 optimum detector. Long pulse 740 and combined pulse 750 demonstrate the highest initial gain, however, as seen in 600, the highest overall SIR 610 is observed in the short pulse 760 optimum detector. Thus, the short pulse 760 optimum detector is the better indication of overall gain being fifteen decibels for most range cells. This gain is a result of the high SIR achieved by the optimum detector. SIR gain is indicative of an increase in detectability of the target 210. Note that this improvement is attained without any Doppler processing.

Figure 8:
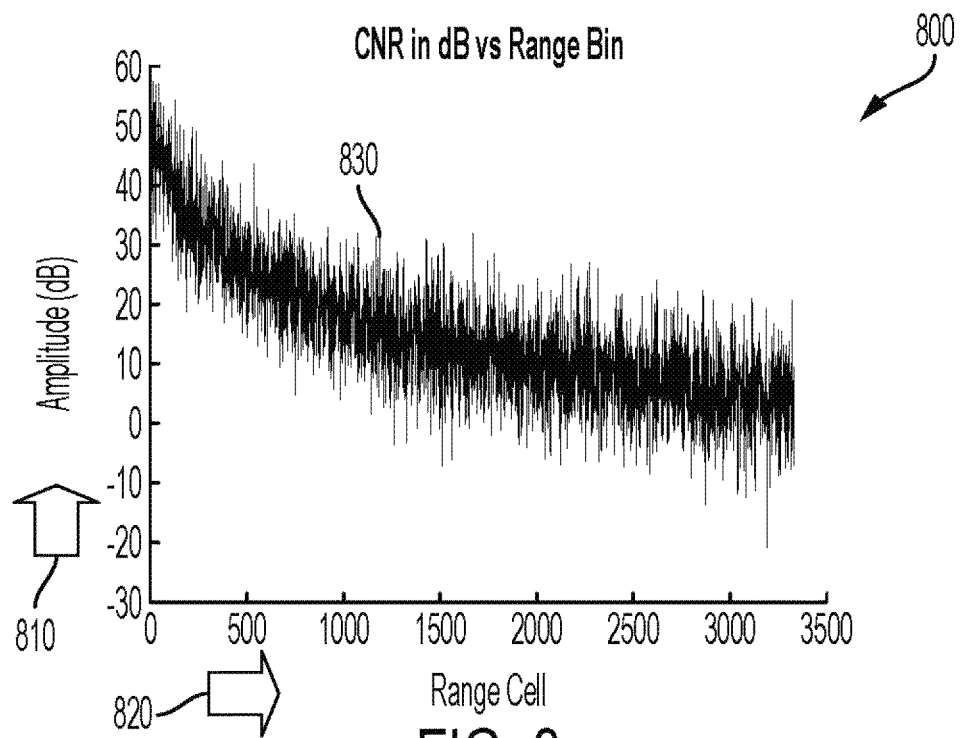
FIG. 8 is a graphical view of CNR as a function of range.

FIG. 8 is a graphical representation 800 of the minimum range CNR set to fifty decibels incorporating a Log-Normal fluctuation to demonstrate random clutter. Range cell 820 denotes the abscissa, while amplitude 810 (dB) denotes the ordinate, similar to view 500. CNR amplitude 810 still falls off to the minus third power. Incorporating this function will enable further proof to the robust nature of these detectors.

Figure 9:
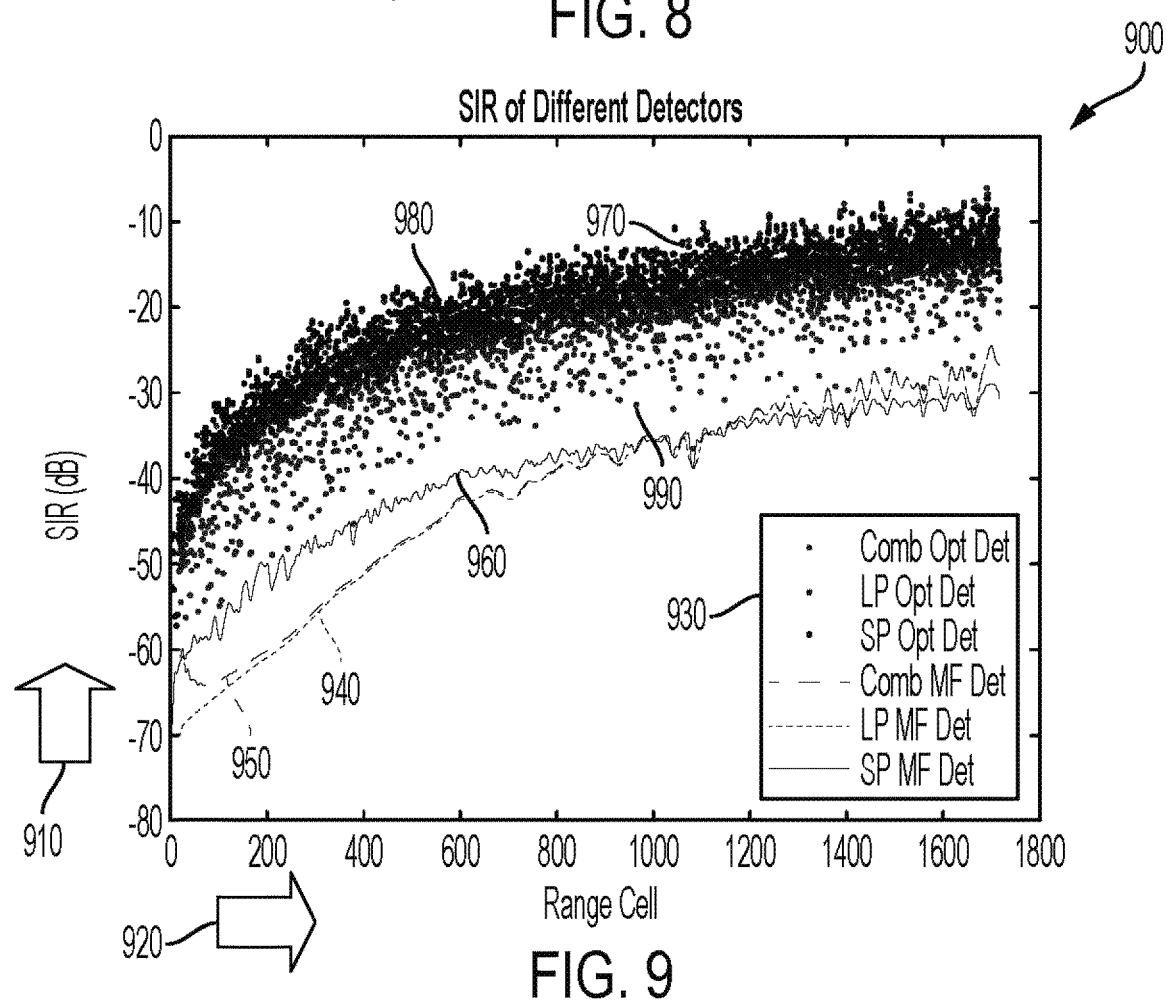
FIG. 9 is a graphical view of SIR for optimum detector and matched filter of the short pulse, long pulse, and combined pulse signals with Log-Normal clutter as a function of range.

FIG. 9 illustrates a graphical view 900 of the plotted SIR incorporating the more realistic CNR set forth in FIG. 8. Range cell 920 denotes the abscissa, while SIR 910 (dB) denotes the ordinate, similar to view 600. A legend 930 identifies the symbols for each pulses SIR 910. The long pulse 940, short pulse 960, and combined pulse 950 SIRs for the matched filter are reduced. This effect is due to the fluctuations from the realistic clutter model. Combining these fluctuations with range time sidelobes of the waveforms enables large clutter cells to interfere with the SIR 910 of smaller clutter cells. Thus, the matched filter is dependent on the waveform used and its resulting range time sidelobe performance. Whereas, the optimum detector long pulse 970, short pulse 980, and combined pulse 990 SIRs are not as affected. The exemplary detector is less sensitive to waveform sidelobes, resulting in improved performance through clutter fluctuations.

Figure 10:
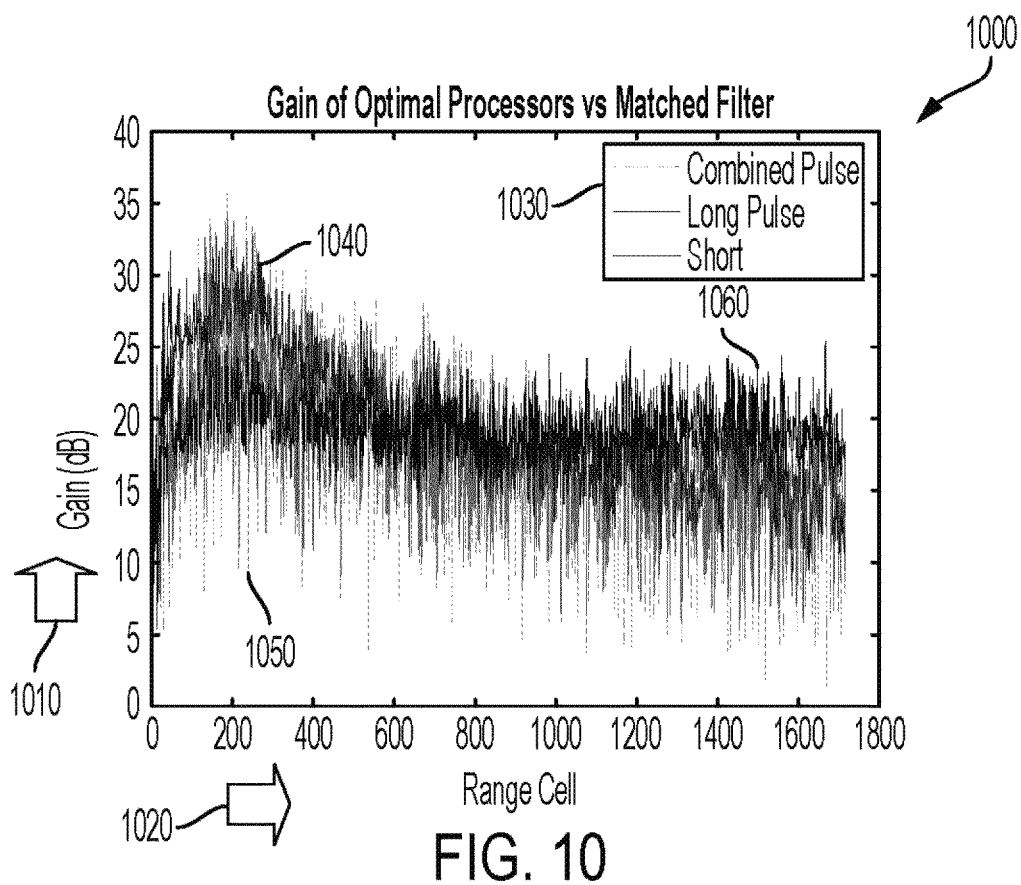
FIG. 10 is a graphical view of SIR gain for the optimum detector over matched filter with CNR as a function of range.

FIG. 10 demonstrates a graphical view 1000 of the optimum detector's mean SIR gain over the matched filter, based on fifty trials, using the SIRs illustrated in FIG. 9. Range cell 1020 denotes the abscissa, while gain 1010 (dB) denotes the ordinate, similar to view 700. Using the legend 1030 it is seen that the long pulse 1050 and combined pulse 1060 demonstrate improvements over the matched filter after introducing the realistic clutter scenario, set forth in FIG. 8. Additionally, the short pulse 1040 of the optimum detector has an average improvement in SIR of twenty decibels as opposed to fifteen and a half decibels when compared to FIG. 7. Superior performance in a realistic clutter environment is another advancement the exemplary optimum detector demonstrates over the current state of the art.

Improvements in the presence of real world effects, further demonstrates the optimum detectors effectiveness, even though it requires knowledge of the CNR. This information is not known, but it is estimated as described in T. L. Foreman, "Derivation of Optimum Detector for Range Migrating Targets In The Presence Of Clutter," NSWCDD/TR-20/167, April 2020. This estimation introduces errors that reduce the performance of detectors. To asses these errors, a Monte Carlo simulation is run using a clutter scene with fifty decibels minimum range CNR and Log-Normal fluctuations. Random changes are made to the clutter scene and errors from trial to trial. The error is Log Normal with a standard deviation of ten decibels. This level of error was selected based on the accuracy of the Littoral Clutter Model to predict clutter.

Figure 11:
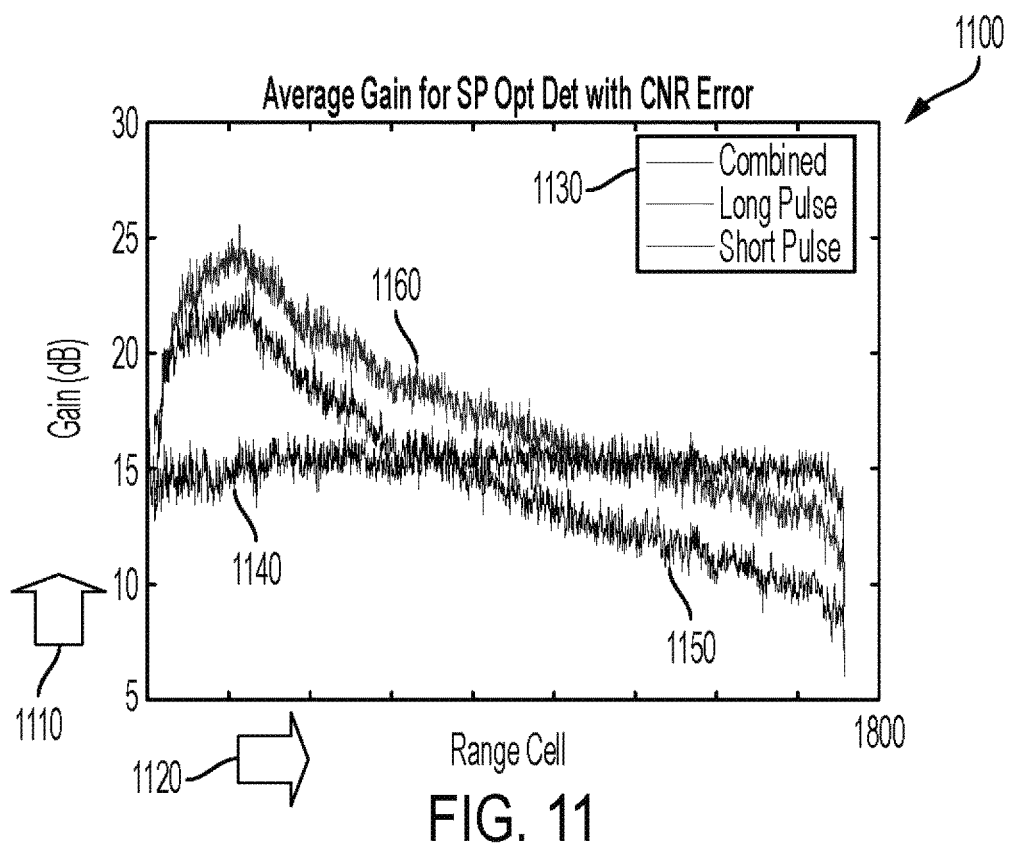
FIG. 11 is a graphical view of average gain for the optimum detector over matched filter with CNR clutter amplitude errors.

FIG. 11 illustrates a graph view 1100 of average gain of the optimum detector over the matched filter with clutter amplitude errors over fifty trials. Range cell 1120 denotes the abscissa, while gain 1110 (dB) denotes the ordinate. The legend 1130 indicates the symbols for long pulse 1150, short pulse 1140, and combined pulse 1160. Incorporating the errors as described above results in a short pulse 1140 SIR gain of approximately fifteen decibels. With a realistic amount of errors the optimum detector developed here maintains a significant improvement over the matched filter.

Figure 12:
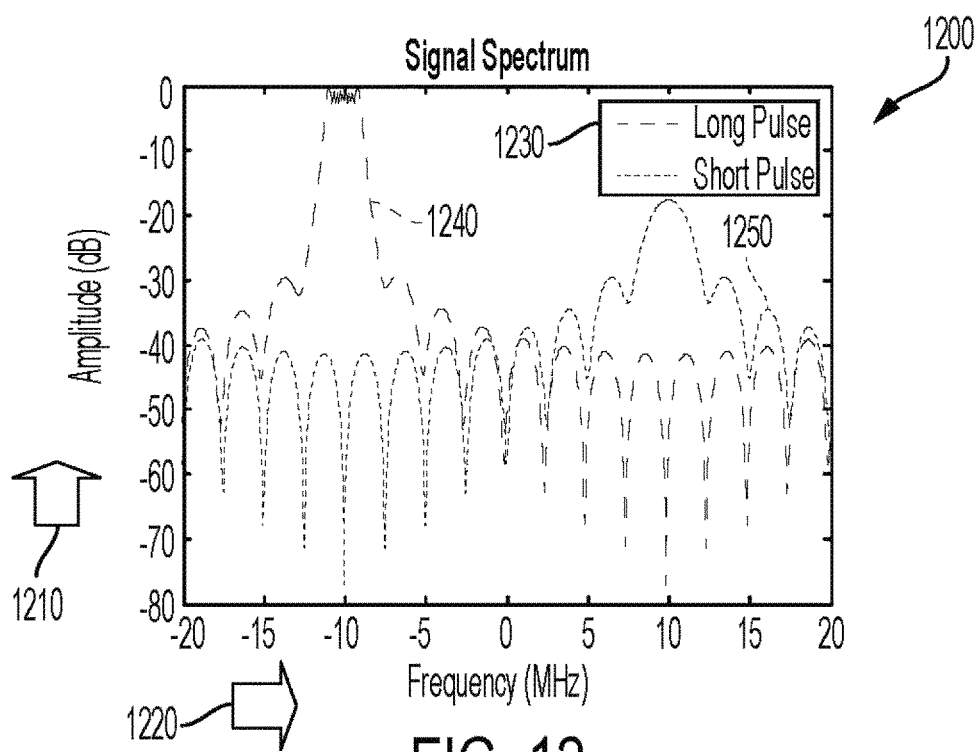
FIG. 12 is a graphical view of long and short pulse signal spectrum with offset, wider frequency.

One can reasonably assume a scenario in which the two signals are frequency separated. FIG. 12 shows a graph view 1200 of maximum separation on the frequency spectrum with a fundamental frequency of ten megahertz. Frequency 1220 (MHz) denotes the abscissa, while amplitude 1210 (dB) denotes the ordinate, similar to view 400. The legend 1230 indicates the long pulse 1240 and short pulse 1250 on the spectrum. The long pulse 1240 still outputs a larger relative amplitude 1210 than the short pulse 1250.

Figure 13:
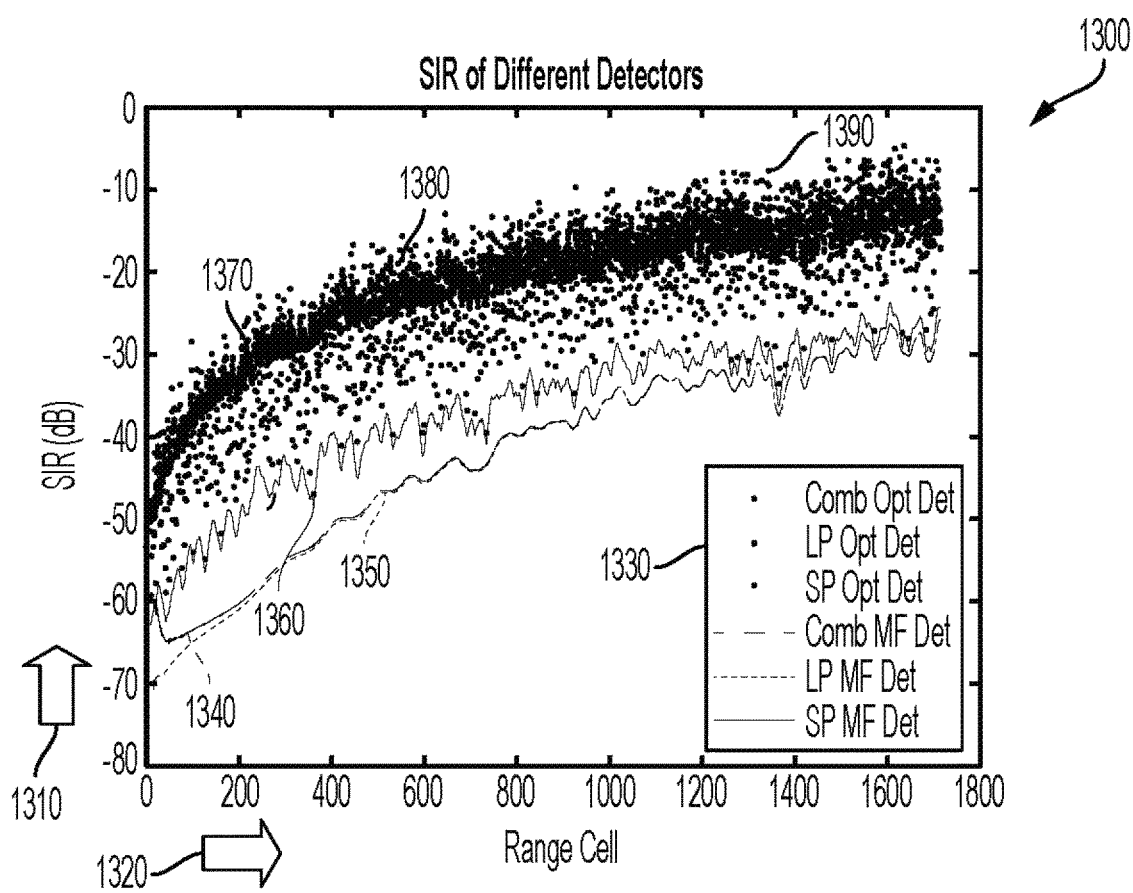
FIG. 13 is a graphical view of SIR for optimum detector and matched filter as a function of range.

FIG. 13 is a graph view 1300 of the SIR for each pulse generated by the optimum detector and matched filter in the frequency separated spectrum. Range cell 1320 denotes the abscissa, while SIR 1310 (dB) denotes the ordinate, similar to view 600. A legend 1330 indicates the appropriate symbol for each plotted signal. The short pulse 1380, long pulse 1370, and combined pulse 1390 SIR for the optimum detector are the same compared to view 900 with less frequency separation. However, the short pulse 1360, long pulse 1350, and combined pulse 1340 SIR for the matched filter are higher because channel cross talk is reduced.

Figure 14:
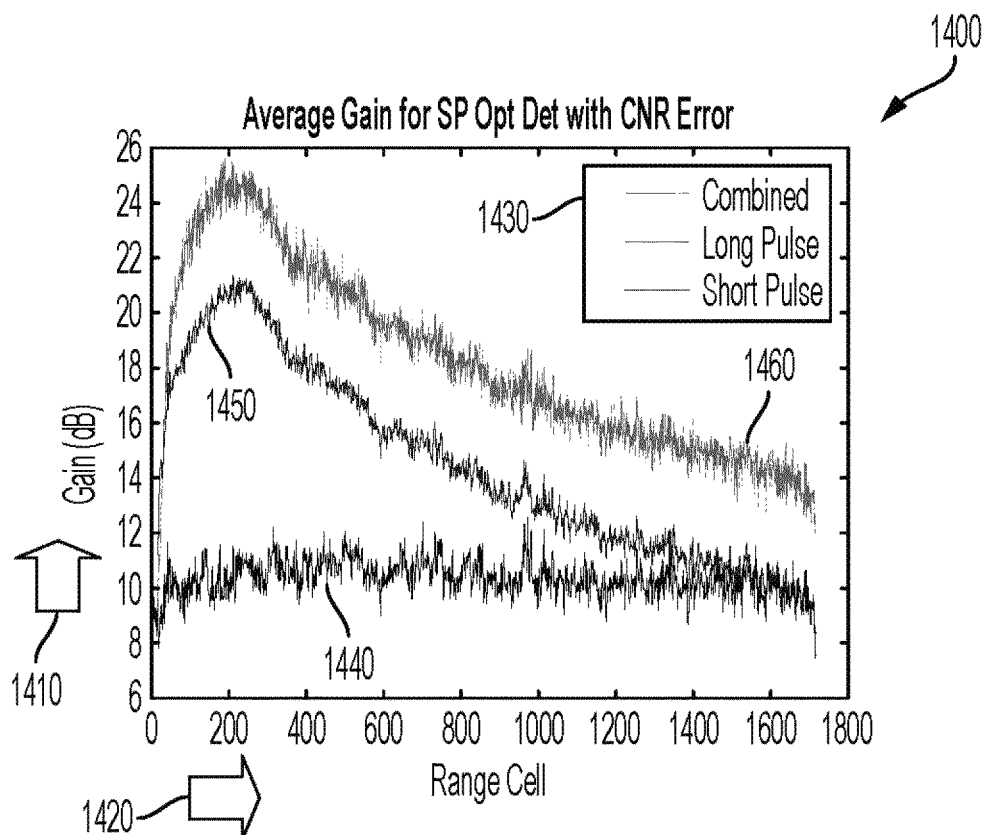
FIG. 14 is a graphical view of SIR gain with offset for the optimum detector over matched filter and CNR as a function of range.

FIG. 14 illustrates a graph view 1400 of the plotted gain for the optimum detector over the matched filter while incorporating frequency separation and realistic CNR error.

Range cell 1420 denotes the abscissa, while gain 1410 (dB) denotes the ordinate. A legend 1430 indicates the short pulse 1440, long pulse 1450, and combined pulse 1460 average gain. It is observed that the short pulse 1440 holds approximately eleven decibels over the matched filter for most range cells. Thus, the optimum detector demonstrates superior performance, even with maximum frequency separation to increase the SIR of the matched filter. One should note that the optimum detector developed here has the same SIR whether the signals are adjacent or maximally separated.

Section IV—MIMO Detectors: Previously, two signals with maximum frequency separation (presumed to be orthogonal) were determined to retain some degree of clutter cross talk between channels. Further, a method for improving the radar signal processing within the clutter was developed. Applying the approach implemented above, a similar detector is developed to improve MIMO radar signal processing in clutter.

Figure 15:
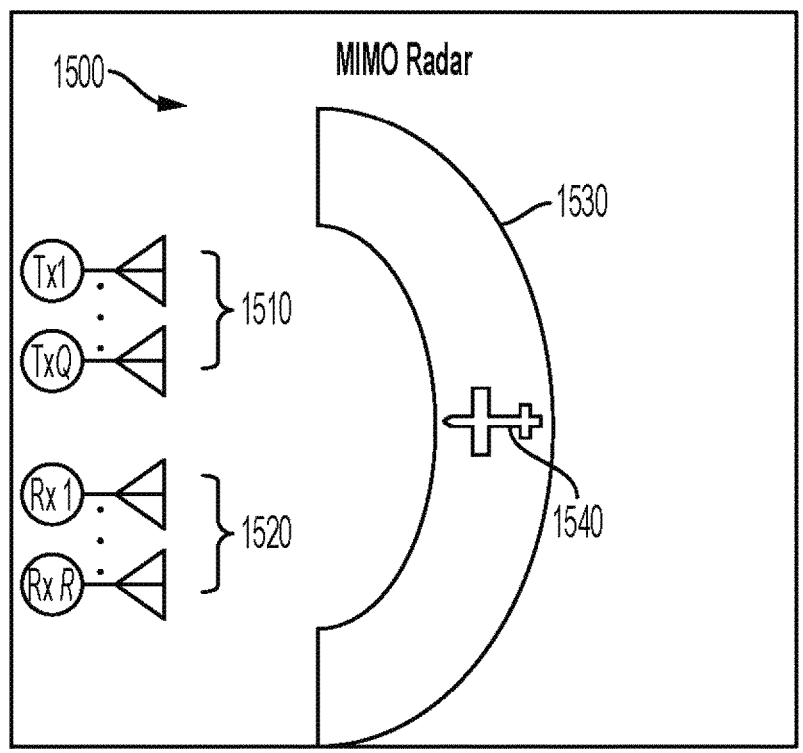
FIG. 15 is a schematic diagram view of MIMO radar signal processing in clutter.

FIG. 15 illustrates a schematic diagram view 1500 for MIMO radar. There are Q transmit antennas 235, 1510 and R receive antennas 255, 1520. Each transmit antenna 235, 1510 illuminates the same clutter resolution cell 1530. The receive antennas 255, 1520 receive the backscatter from the illuminated clutter resolution cell 1530. A target 210, 1540 is located within the clutter resolution cell 1530. Resolution cell width is determined by the individual antennas beam width. Range depth of the resolution cell is determined by the range resolution of the waveform. The signal model for the receive antenna r 255, 1520 due to the target 210, 1540 is:

$$y_t^r(t) = b_r \sum_{q=1}^{Q} a_q \alpha s^q(t - t_r), \quad (39)$$

where $s^q(t)$ is the baseband signal transmitted by the $q^{th}$ antenna 1510, $t_r$ is the range induced time delay of the target 210, 1540, $\alpha$ is the complex amplitude of the target 210, 1540, $a_q$ is the phase shift corresponding to the target angle relative to transmit antenna q 235, 1510, and $b_r$ is the phase shift corresponding to the target angle relative to receive antenna r 255, 1520.

Putting this in vector notation produces:

$$y_t^r(t) = a_r \sum_{q=1}^{Q} b_q \alpha \tilde{S}^q \delta_k \quad (40)$$

where $\delta_k$ is a vector with all zeros except the $k^{th}$ element being one (indicating target location), and $\tilde{S}^q$ is the convolution matrix for the $q^{th}$ $q^{th}$ signal calculated as:

$$\tilde{S}^q = \begin{bmatrix} 0 & \cdots & 0 & (s^q)^t \\ 0 & \cdots & (s^q)^t & 0 \\ & \ddots & & \\ (s^q)^t & 0 & \cdots & 0 \end{bmatrix} \quad (41)$$

Note that $s^q$ is the vector of baseband samples of $s^q(t)$ and the superscript t indicates transpose. The receive data at the $r^{th}$ receive antenna 255, 1520 from the interference is:

$$y_I^r(t) = \sum_{q=1}^{Q} \tilde{S}^q c^q + n, \quad (42)$$

where $c^q$ is the vector of complex clutter backscatter illuminated by the $q^{th}$ transmit antenna 235, 1510 observed by the $r^{th}$ receive antenna 255, 1520 and n is the vector of receiver noise that is complex AWGN.

One can assume that the clutter and receiver noise are zero mean and independent. Thus the correlation matrix of the interference is determined as:

$$R_I = E\{y_I^r(y_I^r)^H\} = \sum_{q=1}^{Q}\sum_{\lambda=1}^{Q} \tilde{S}^q E\{c^q(c^\lambda)^H\}(\tilde{S}^\lambda)^H + \sigma_n^2 I \quad (43)$$

The cross terms (i.e., q≠λ) in eqn. (43) need some consideration. The signals transmitted are desired to be orthogonal. Thus, for q≠λ, $\tilde{S}^q(\tilde{S}^\lambda)^H \approx [0]$. The clutter resolution cell will generally be large in the angle (cross range) dimension. As a result, the clutter resolution cells consist of many individual scatters with different phases. The receive antenna 255, 1520 sees the summation of these scatters, with random phase between the same scatterer, as it is illuminated by different antennas. The net effect of this will produce:

$$E\{c^q(c^\lambda)^H\} \approx [0]. \quad (44)$$

Therefore, the assumption that $\tilde{S}^q E\{c^q(c^\lambda)^H\}(\tilde{S}^\lambda) \approx [0]$ is well justified. Based on that, eqn. (43) becomes:

$$R_I = E\{y_I y_I^H\} = \sum_{q=1}^{Q} \tilde{S}^q R_C (\tilde{S}^q)^H + \sigma_n^2 I. \quad (45)$$

where $R_C$ was defined in eqn. (12) above.

Utilizing methods that enable assumption of clutter parameters an optimum detector is developed. Following the approach of T. L. Foreman, "Optimal Processing of Multiple-Pulse Radar Signals in Clutter," NSWCDD/TR00/112, August 2000 and referencing the signal and interference models developed above, the detector for the $q^{th}$ return observed by the $r^{th}$ antenna 1520 is:

$$\left|\delta_k^H (\tilde{S}^q)^H R_I^{-1} y^r\right| \begin{array}{c} H_1 \\ > \\ < \\ H_0 \end{array} \eta \quad (46)$$

MIMO radar signal processing coherently integrates the returns for the given receive antenna 255, 1520 and transmit sign. However, the conventional matched filter approach will eliminate all other transmitted signals, which is not desired. Applying the optimum detector in eqn. (46) to replace the matched filter in MIMO radar signal processing produces:

$$z = \delta_k^H (\tilde{S}^q)^H R_I^{-1} y^r \quad (47)$$

where z replaces the output of the matched filter as the optimum detector output. Note in this development that target motion was ignored. Applying the target motion to the detector is straight forward and illustrated in T. L. Foreman, (2020). For reference using the signal and interference models defined above, the matched filter detector is formed as:

$$|\delta_k^H (\tilde{S}^q)^H R_I^{-1} y^r| \underset{H_0}{\overset{H_1}{\underset{<}{>}}} \eta \quad (48)$$

Note that for the situation of noise only (no clutter), the matched filter behaves as an optimum detector and eqn. (46) becomes eqn. (48).

Using the approach to SIR calculation performed previously for the short/long pulse examples, the SIR for the optimum detector is found as:

$$SIR_{MIMO\_Opt} = |\alpha|^2 \delta_k^H (\tilde{S}^q)^H R_I^{-1} \tilde{S}^q \delta_k \quad (49)$$

While the SIR for the matched filter is:

$$SIR_{MIMO\_MF} = |\alpha|^2 \frac{|\delta_k^H (\tilde{S}^q)^H \tilde{S}^q \delta_k|^2}{\delta_k^H (\tilde{S}^q)^H R_I \tilde{S}^q \delta_k} \quad (50)$$

and the SIR for the optimum detector with clutter parameter errors (mismatched optimum detector) is:

$$SIR_{MIMO} = \frac{|\alpha|^2 (\delta_k^H (\tilde{S}^r)^H R_{ID}^{-1} \tilde{S}^r \delta_k)^2}{\delta_k^H (\tilde{S}^r)^H R_{ID}^{-1} R_{IA} R_{ID}^{-1} \tilde{S}^r \delta_k} \quad (51)$$

where $R_{ID}$ is the design (i.e., assumed or estimated) interference correlation matrix and $R_{IA}$ is the actual interference correlation matrix.

Section V—Summary and Results: This study set out to develop a detector that could improve MIMO radar signal processing in clutter. Consequently, eqn. (46) is the detector that was derived for this problem. This optimum detector produces an output with improved SIR by rejecting clutter cross talk between transmitted signals. The potential for improvement upon the current state of the art was demonstrated conceptually using long pulse and short pulse signals with supposed orthogonality.

To illustrate the improvements in MIMO radar signal processing in clutter made possible by the optimum detector, the following example is provided. An MIMO radar transmitting four signals from four different antennas. The signals have different linear chirps. There is an up chirped pulse, down chirped pulse, up/down chirped pulse, and a down/up chirped pulse. The bandwidth of the signals is two and a half megahertz, and the data are sampled in-phase and quadrature (I/Q) at forty megahertz at baseband.

In order to show the benefit of this processing, not only in rejecting cross channel clutter, but also in mitigating the impact of imperfect orthogonality of waveforms, two waveform sets will be studied. FIG. 16 displays a tabular view 1600 of tables providing waveform parameters for the following examples. For the first example the waveform parameters are listed in Table II 1620. The signals in Table II 1620 are typical waveforms used for MIMO. The orthogonality of the signals is achieved by the modulation of the waveforms. The correlation coefficients for the waveform set (defined as $(s^r)^H s^r/N$ are listed in Table III 1630. The correlation values indicate that these waveforms are not perfectly orthogonal. Table III 1630 shows that the signals are de-correlated to some degree due to their different modulation properties.

Figure 17:
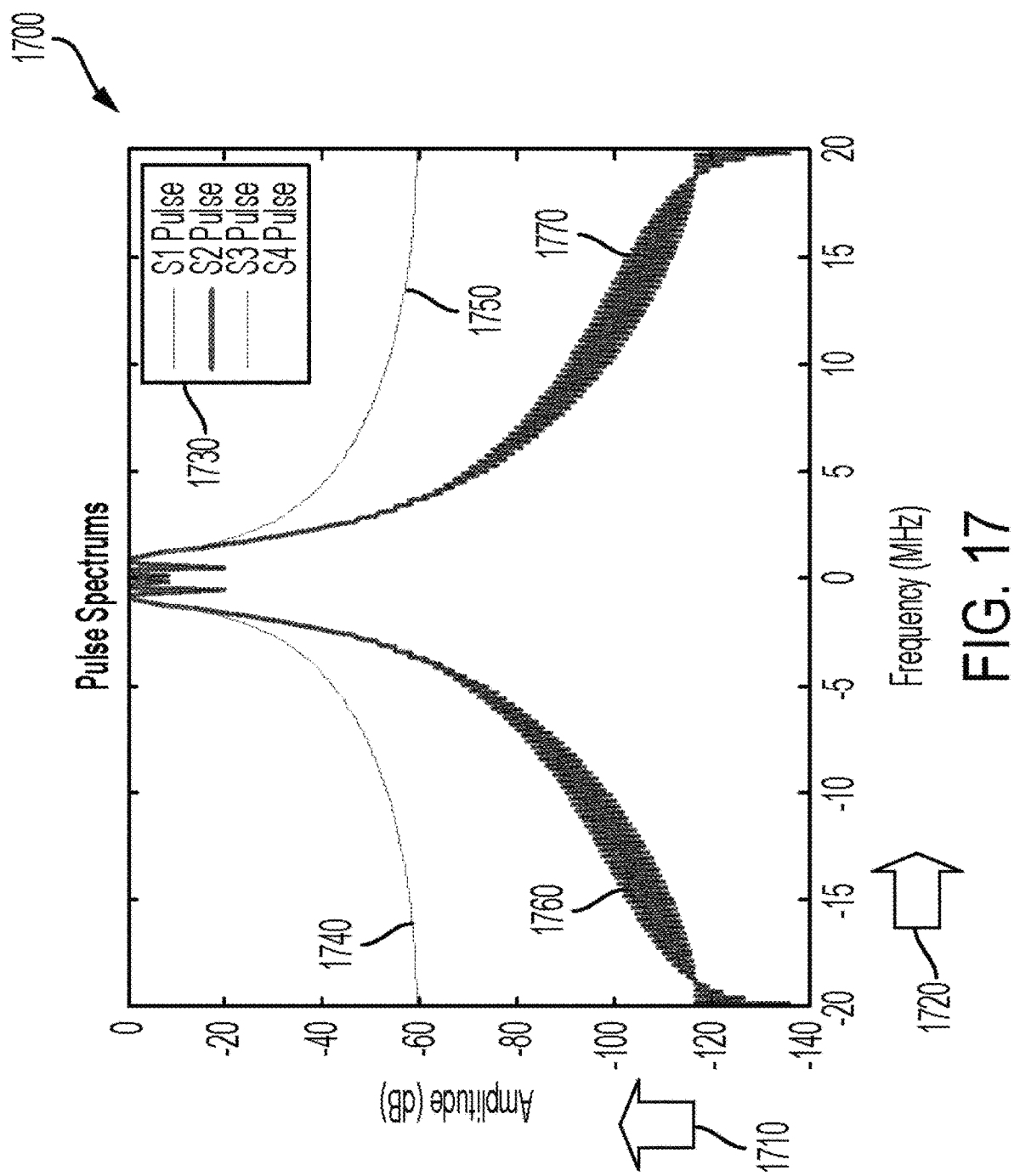
FIG. 17 is a graphical view of four signal spectrums with overlap.

FIG. 17 displays a graph view 1700 of the four signals along the frequency spectrum with overlap. Frequency 1720 (MHz) denotes the abscissa, while amplitude 1710 (dB) denotes the ordinate. A legend 1730 helps to identify the S4 pulse 1740, S3 pulse 1750, S2 pulse 1760, and S1 pulse 1770. Because the center frequencies are the same, the spectrums overlap.

Figure 18:
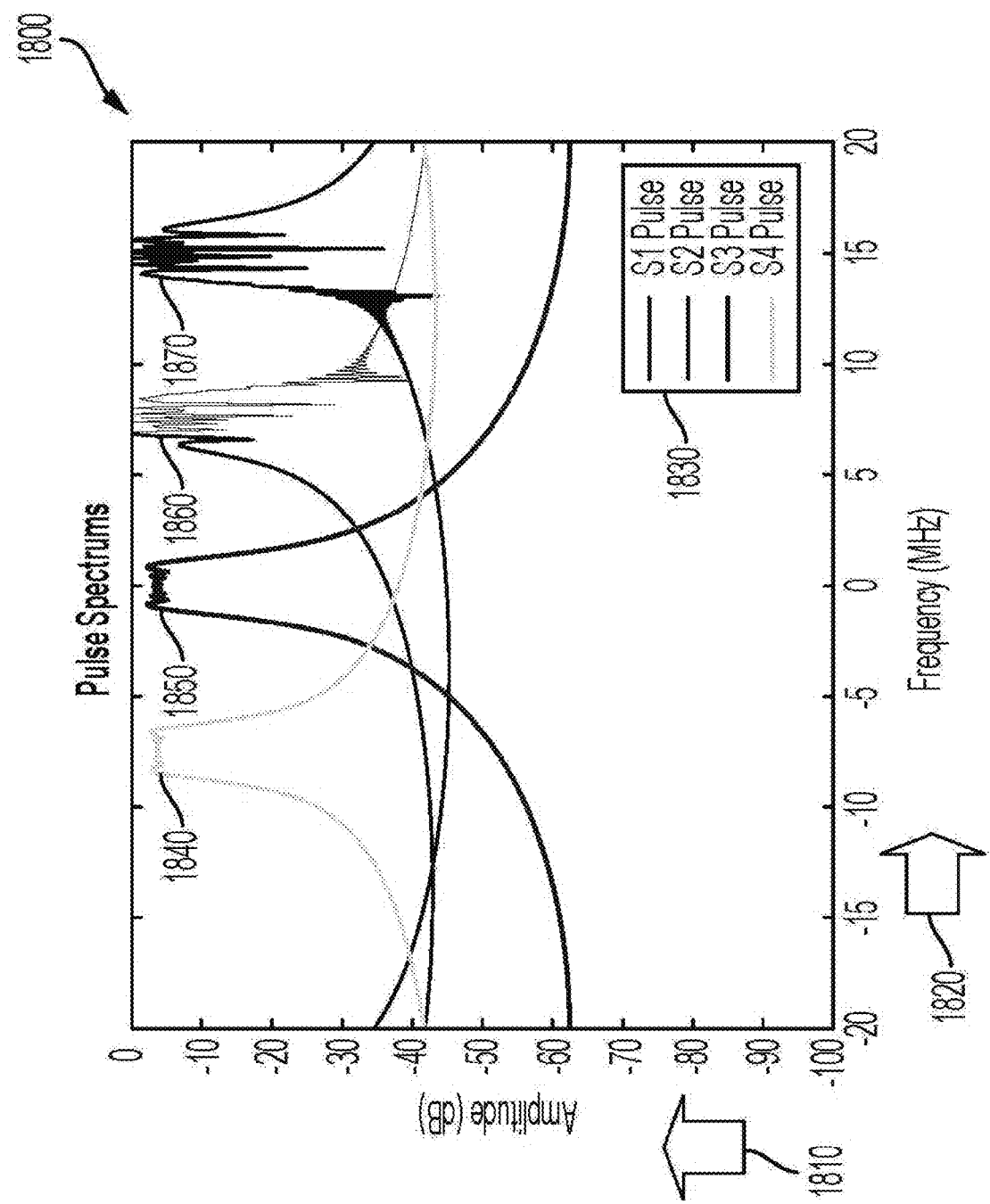
FIG. 18 is a graphical view of four signal spectrums without overlap.

FIG. 18 displays a graph view 1800 of the four signals with different center frequencies along the frequency spectrum, to minimize the cross correlation. Frequency 1820 (MHz) denotes the abscissa, while amplitude 1810 (dB) denotes the ordinate, similar to view 1700. The second set of waveforms have the same modulations, pulse width and time bandwidth product as the first set. The waveform parameters are shown in Table IV 1640 and the signal correlation is given in Table V 1650 from view 1600. The relative amplitude 1810 for each of these signals remains the same. The legend 1830 enables proper identification of S4 pulse 1840, S3 pulse 1850, S2 pulse 1860, and S1 pulse 1870.

Figure 19:
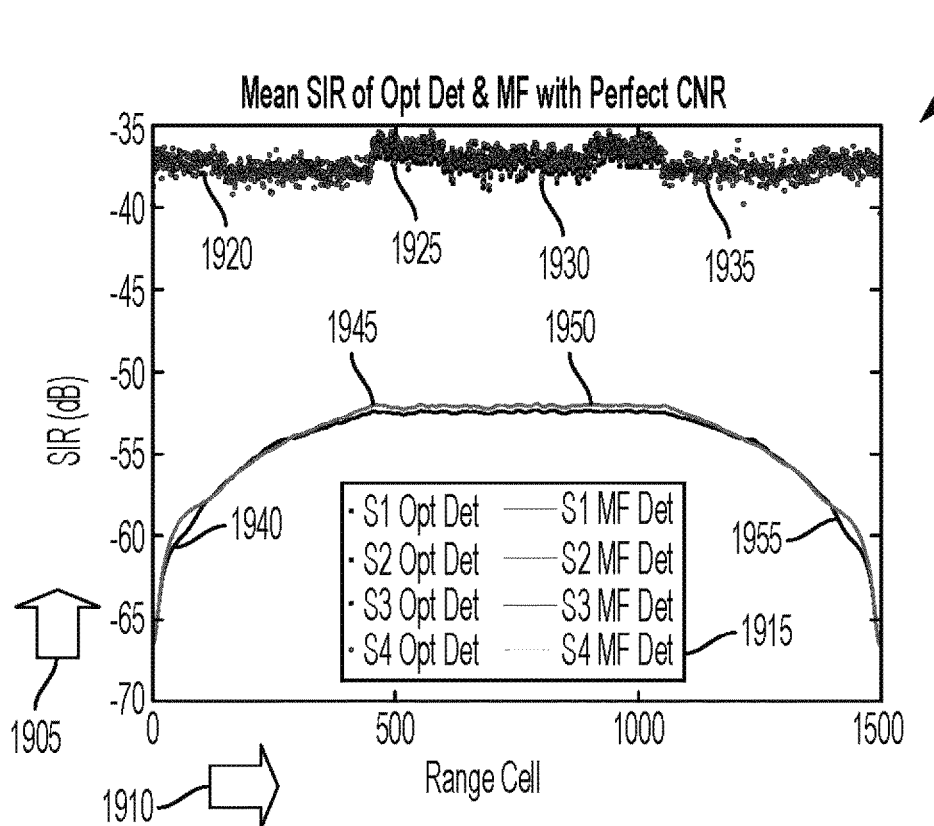
FIG. 19 is a graphical view of mean SIR for optimum detectors and matched filters with perfect CNR and overlapping spectrums.

FIG. 19 illustrates a graph view 1900 of SIR for each overlapping signal spectrum processed by the optimum detector and matched filter. In this figure the average CNR is thirty decibels. Range cell 1910 denotes the abscissa, while SIR 1905 (dB) denotes the ordinate. The parameters used for the clutter fluctuations are from D. C. Schleher, *MTI and Pulsed Doppler Radar with MATLAB*, 2$^{nd}$ Edition, Boston: Artech House, 2010 Table 4.24, Land Clutter (distributed). CNR estimation is perfect therefore no clutter amplitude errors exist. A legend 1915 helps to identify the signals processed by each detector. The SIRs produced by the matched filter signals S4 1945, S3 1950, S2 1940, and S1 1955 are observed to be less than that of the optimum detector. The optimum detector SIRs for signals S4 1920, S3 1935, S2 1925, and S1 1930 surpass that of the matched filter.

Figure 20:
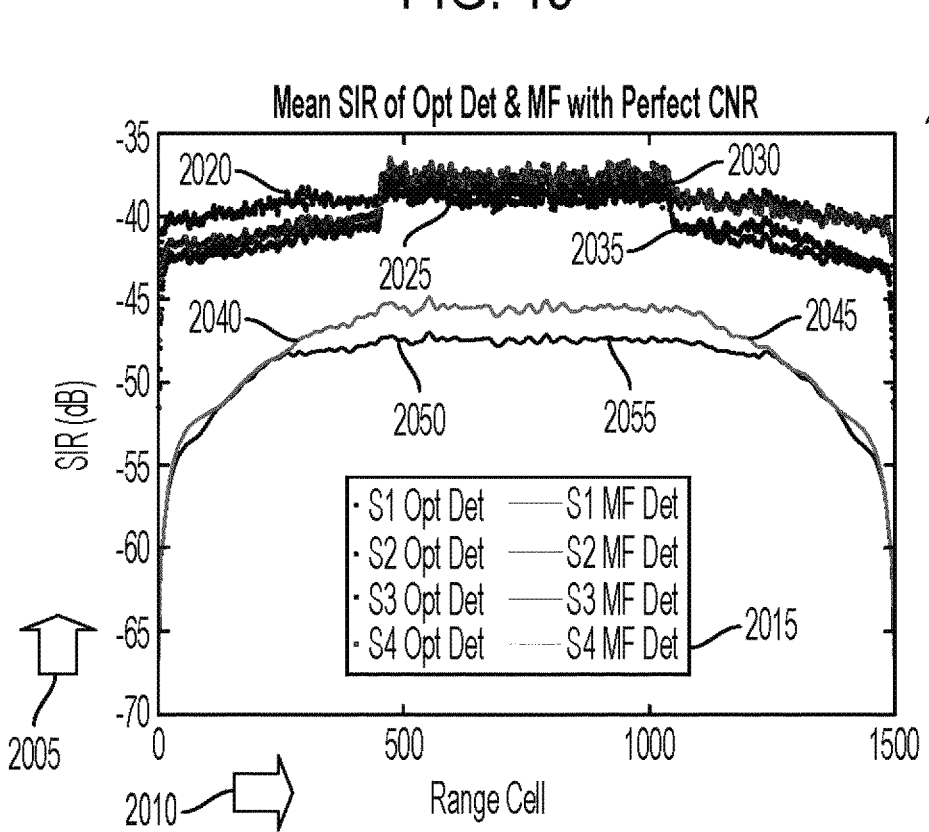
FIG. 20 is a graphical view of mean SIR for optimum detectors and matched filters with perfect CNR and no overlapping spectrums.

FIG. 20 displays a graph view 2000 of SIR for the non-overlapping signal spectrum with perfectly assumed CNR. Range cell 2010 denotes the abscissa, while SIR 2005 (dB) denotes the ordinate, similar to view 1900. Using the legend 2015, it is easy to observe that the matched filter signals S4 2040, S3 2045, S2 2050, and S1 2055 SIRs have improved. This results from improved correlation properties of the non-overlapping signal spectrums. However, the SIRs for the optimum detector S4 2030, S3 2035, S2 2025, and S1 2020 signals have shown minimal change. This factor indicates that the optimum detector, unlike the matched filter, is unaffected when MIMO signal spectrums overlap. Thus, the optimum detector offers the improvement of minimizing spectrum usage while conducting MIMO radar signal processing in clutter.

Figure 21:
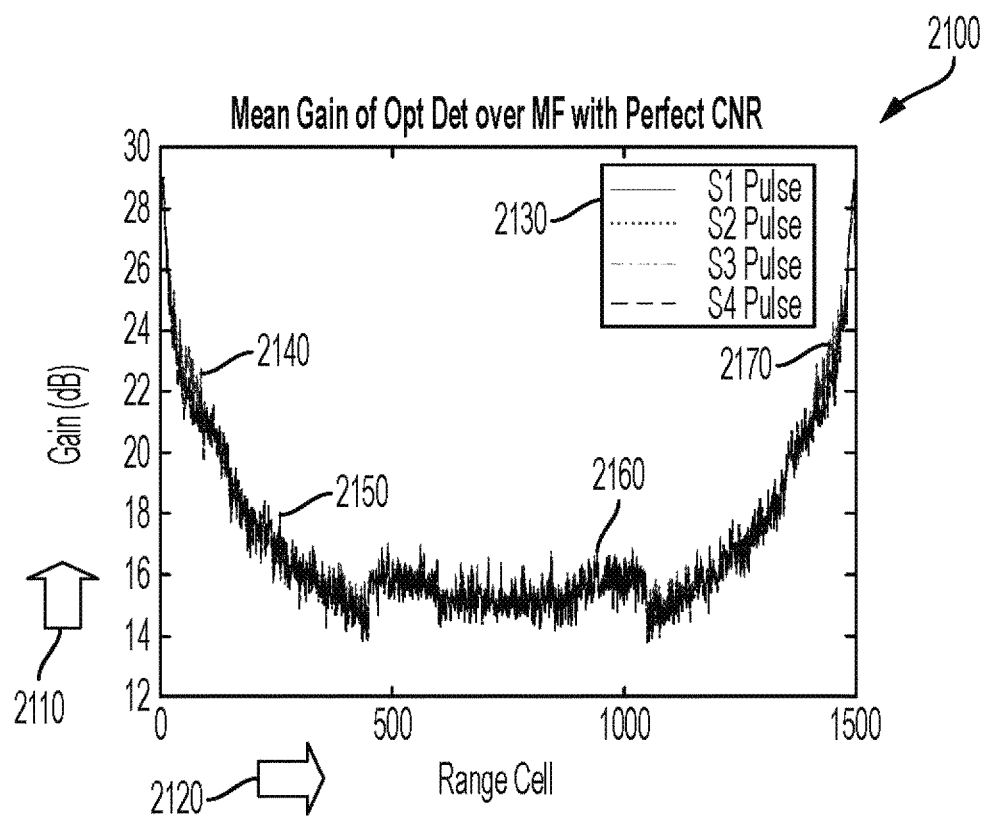
FIG. 21 is a graphical view of mean gain for the optimum detector over matched filter with perfect CNR.

FIG. 21 shows a graph view 2100 plotting the gain for the optimum detector over the matched filter. CNR fluctuations are averaged at thirty decibels and perfect knowledge of the CNR is assumed for this graph. Range cell 2120 denotes the abscissa, while gain 2110 (dB) denotes the ordinate. A legend 2130 enables identification of gains for S1 pulse 2140, S2 pulse 2170, S3 pulse 2150, and S4 pulse 2160. The gain starts out around twenty-seven decibels at range cell one and generally decreases until completing the uneclipsed range cells. The detector in eqns. (46) and (48) will process all range cells eclipsed and uneclipsed. (The specific range cell being processed is determined by k.) Maximum SIR for both the optimum detector and the matched filter is achieved when the radar has all the range samples that include the target 210, 1540. The gain of the optimum detector in the uneclipsed region is nearly sixteen decibels. Note that the performance changes slightly as a function of the pulse due to the different correlation values (Table II 1620).

Figure 22:
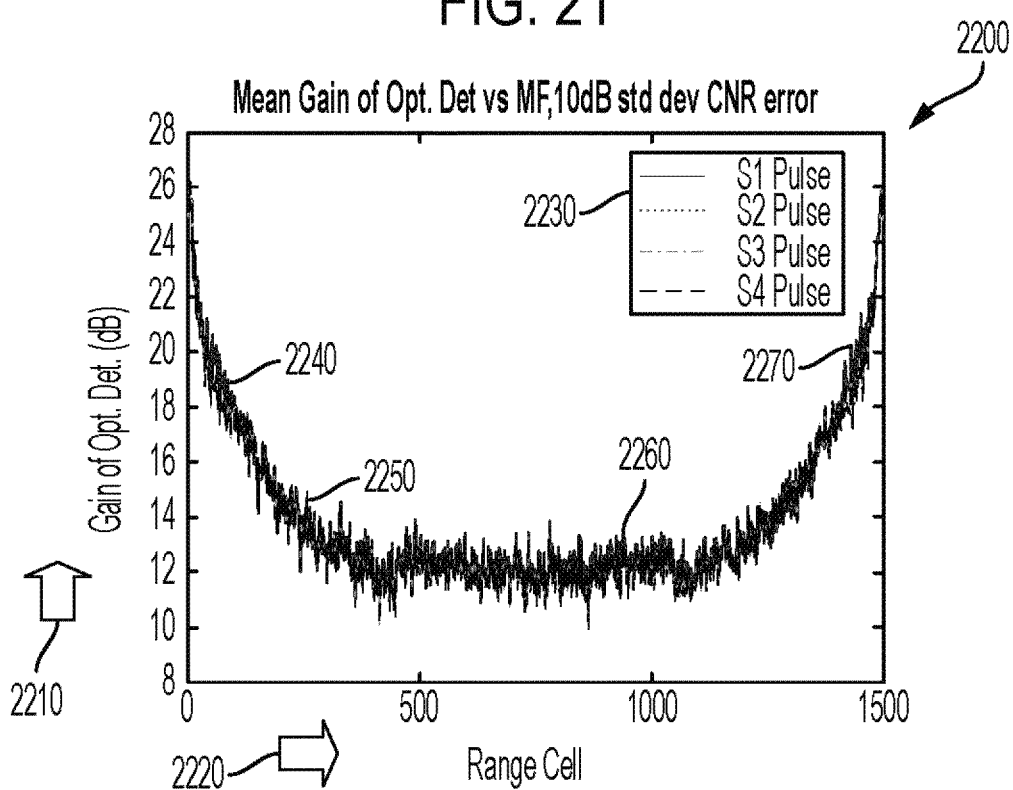
FIG. 22 is a graphical view of mean gain for the optimum detector over matched filter with CNR error.

FIG. 22 illustrates a graph view 2200 of gain plotted for the optimum detector over the matched filter incorporating clutter estimation errors in $R_I$ in eqn. (46) to the degree of ten decibels standard deviation. Range cell 2220 denotes the abscissa, while gain of Opt. Det. 2210 (dB) denotes the ordinate, similar to view 2100. A legend 2230 enables identification of S1 pulse 2240, S2 pulse 2270, S3 pulse 2250, and S4 pulse 2260. The gain here is presented in a realistic clutter environment for radar signal processing.

Figure 23:
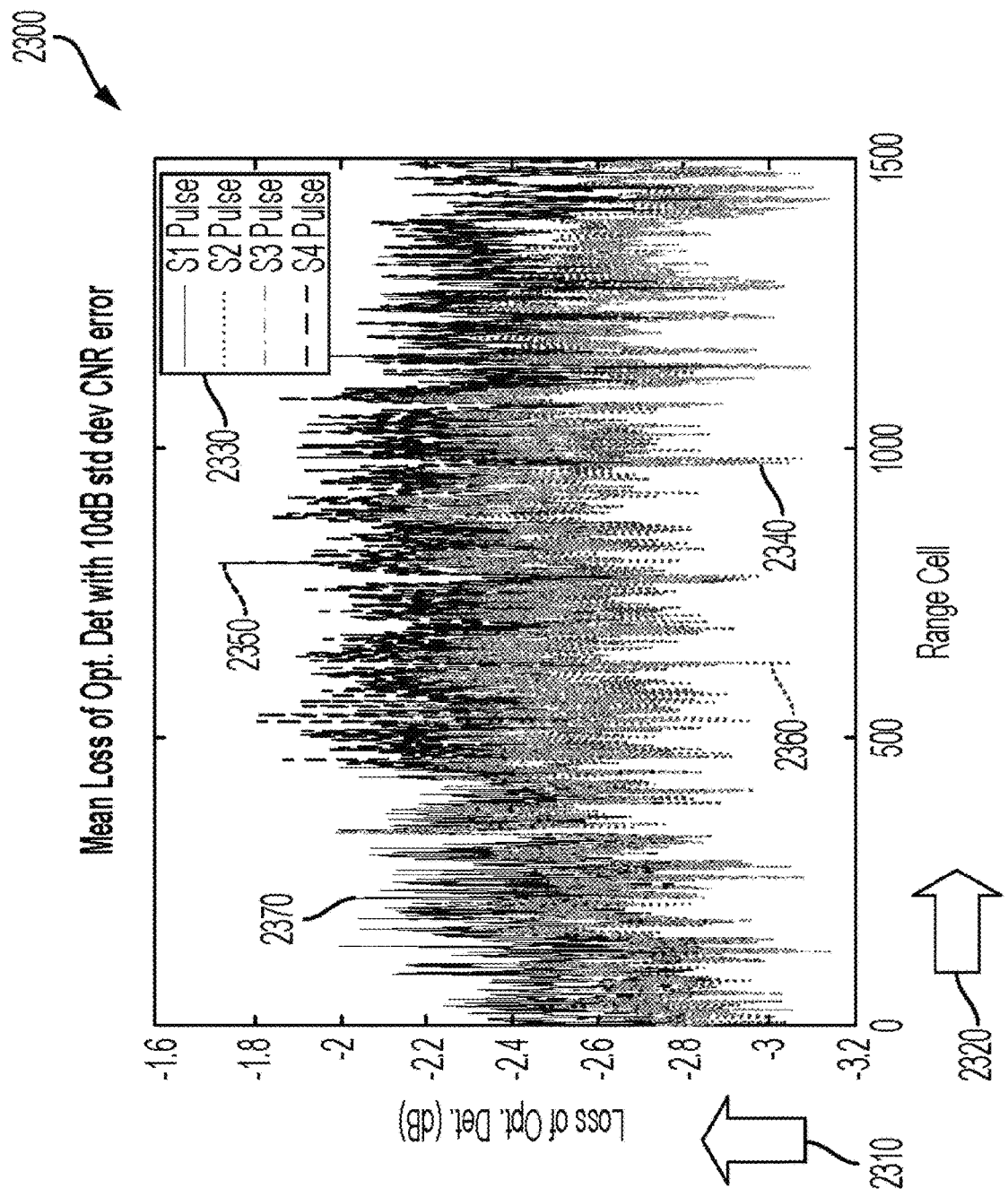
FIG. 23 is a graphical view of mean loss of matched filter due to clutter amplitude estimation errors.

FIG. 23 shows a graph view 2300 of the mean loss of gain for the optimum filter due to clutter amplitude estimation errors. Range cell 2320 denotes the abscissa, while Loss of Optimum Detector 2310 (dB) denotes the ordinate. The legend 2330 enables tracking of S1 pulse 2370, S2 pulse 2360, S3 pulse 2340, and S4 pulse 2350. The observed average loss is approximately 2.4 decibels. An overall gain in performance of MIMO radar signal processing in clutter is seen for the optimum detector (FIG. 22) when compared to the current state of the art matched filter approach.

While certain features of the embodiments of the invention have been illustrated as described herein, many modifications, substitutions, changes, and equivalents will now occur to those skilled in the art. It is, therefore, to be understood that the appended claims are intended to cover all such modifications and changes as fall within the true spirit of the embodiments.

What is claimed is:

1. A computer-implemented method for detecting a target amidst clutter by a radar system able to transmit a plural sequence of electromagnetic transmit signals from first to last on at least one transmit antennae, receiving a plurality of reflection signals from said target and said clutter within a plurality of range cells, and processing said plurality of reflection signals, said method comprising:
    determining a baseband signal for each of the transmit signals of the plural sequence;
    calculating a signal convolution matrix for said each of the transmit signals;
    estimating a clutter amplitude for each range cell within the plurality of range cells using modeling estimations;
    calculating a clutter correlation matrix for the clutter in the plurality of reflection signals;
    determining a noise variance for the transmit signals in the plural sequence;
    calculating an interference correlation matrix for the transmit signals in the plural sequence; and
    forming a target detector for the radar system, said forming operation further including:
        sequentially processing the plurality of reflection signals,
        rejecting cross talk from said clutter correlation matrix between the plurality of reflection signals, and
        increasing a signal-to-interference ratio for said target detector, thereby optimizing detectability of the target.

2. The method according to claim 1, wherein said modeling estimations further include: at least one of the Littoral Clutter Model and the clutter mapping method.

3. The method according to claim 1, wherein the transmit signals are transmitted per separate transmit antennae.

4. The method according to claim 1, wherein said developing of signal and interference models further includes:
    determining said baseband signal for each of the transmit signals by identifying frequencies of the transmitted signals before modulating the transmit signals to higher frequencies;
    determining said signal convolution matrix for the transmit signals by utilizing the baseband samples to re-orient the plurality of reflection signals for processing by said target detector;
    estimating an amplitude of the clutter from the plurality of reflection signals;
    determining said clutter correlation matrix from said amplitude of the clutter and noise variance from the transmit signals;
    determining said interference correlation matrix for the transmit signals using values gathered from the clutter; and
    forming said target detector for the radar system.

5. The method according to claim 1, wherein said each of the transmit signals includes a long pulse followed by a short pulse.

* * * * *